United States Patent
Le Van Gong et al.

(10) Patent No.: US 12,231,543 B2
(45) Date of Patent: *Feb. 18, 2025

(54) SYSTEMS AND METHODS FOR CONFIGURING A NETWORKED SYSTEM TO PERFORM THRESHOLD MULTI-PARTY COMPUTATION

(71) Applicant: PayPal, Inc., San Jose, CA (US)

(72) Inventors: Hubert Andre Le Van Gong, San Jose, CA (US); Khai Hanh Tang, Singapore (SG); Shanshan Hua, Singapore (SG)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/414,872

(22) Filed: Jan. 17, 2024

(65) Prior Publication Data
US 2024/0235821 A1    Jul. 11, 2024

Related U.S. Application Data

(63) Continuation of application No. 17/459,076, filed on Aug. 27, 2021, now Pat. No. 11,909,866.

(51) Int. Cl.
*H04L 9/08*    (2006.01)
*H04L 9/14*    (2006.01)

(52) U.S. Cl.
CPC .......... *H04L 9/0825* (2013.01); *H04L 9/0833* (2013.01); *H04L 9/14* (2013.01)

(58) Field of Classification Search
CPC ........ H04L 9/0825; H04L 9/0833; H04L 9/14
See application file for complete search history.

(56) References Cited

U.S. PATENT DOCUMENTS 10,630,471 B1 *    4/2020    Lindell ................. H04L 9/0861
2017/0132257 A1 *    5/2017    Baird, III ............ G06F 16/2255
(Continued)

OTHER PUBLICATIONS

Donmez T.C.M., "Implementation of a Secure Multiparty Computation Protocol," Oct. 2017, 173 pages.
(Continued)

*Primary Examiner* — Darshan I Dhruv
(74) *Attorney, Agent, or Firm* — Haynes and Boone, LLP

(57) ABSTRACT

Methods and systems are presented for providing a multi-party computation (MPC) framework for dynamically configuring, deploying, and utilizing an MPC system for performing distributed computations. Based on device attributes and network attributes associated with computer nodes that are available to be part of the MPC system, a configuration for the MPC system is determined. The configuration may specify a total number of computer nodes within the MPC system, a minimum number of computer nodes required to participate in performing a computation process, a key distribution mechanism, and a computation processing mechanism. Encryption keys are generated and distributed among the computer nodes based on the key distribution mechanism. Upon receiving a request for performing the computation, updated network attributes are obtained. The configuration of the MPC system is dynamically modified based on the updated network attributes, and the MPC system performs the computations according to the modified configuration.

20 Claims, 10 Drawing Sheets

(56) References Cited

U.S. PATENT DOCUMENTS

| | | | | |
|---|---|---|---|---|
| 2019/0190705 | A1* | 6/2019 | Dolev | G06N 20/00 |
| 2019/0205568 | A1* | 7/2019 | Veugen | H04L 9/008 |
| 2020/0084048 | A1* | 3/2020 | Lindell | H04L 9/3255 |
| 2020/0151340 | A1* | 5/2020 | Falk | H04L 9/00 |
| 2021/0359846 | A1* | 11/2021 | Wright | H04L 9/0643 |
| 2021/0373937 | A1* | 12/2021 | Veeningen | H04L 63/101 |
| 2021/0391987 | A1* | 12/2021 | Badrinarayanan | H04L 9/30 |
| 2022/0158980 | A1* | 5/2022 | Jain | H04L 9/0894 |
| 2022/0318907 | A1* | 10/2022 | Bleznak | G06Q 20/065 |

OTHER PUBLICATIONS

Googlecloud., "What a Trip! Measuring Network Latency in the Cloud," https://cloud.google.com/blog/products/networking/using-netperf-and-ping-to-measure-network-latency, May 21, 2021, 7 pages.

Googledocs., "Google Cloud Inter Region Latency," https://docs.aviatrix.com/HowTos/gcp_inter_region_latency.html, Apr. 29, 2021, 1 page.

Martin K.M., et al., "Distributing the Encryption and Decryption of a Block Cipher," Cryptology ePrint Archive: Report 2003/005, https://eprint.iacr.org/2003/005, Jan. 15, 2003, 21 pages.

Tang Y., et al., "Social-Aware Decentralization for Secure and Scalable Multi-Party Computations," 2017 IEEE 37th International Conference on Distributed Computing Systems Workshops, 2017, 6 pages.

Zhao C., et al., "Secure Multi-Party Computation: Theory, Practice and Applications," Information Science, Feb. 2019, vol. 476, pp. 357-372.

\* cited by examiner

Figure 3

SYSTEMS AND METHODS FOR CONFIGURING A NETWORKED SYSTEM TO PERFORM THRESHOLD MULTI-PARTY COMPUTATION

CROSS REFERENCE TO RELATED APPLICATION

The present invention is a Continuation of U.S. patent application Ser. No. 17/459,076, filed Aug. 27, 2021, the disclosure of which is incorporated herein by reference in its entirety.

BACKGROUND

The present specification generally relates to distributed computing, and more specifically, to providing a framework for threshold multi-party computation according to various embodiments of the disclosure.

RELATED ART

Threshold multi-party computations have been used to perform various computation processes that require both security and resiliency. Examples of such computation processes that require both security and resiliency may include encryption of data, generation of digital signatures, and other types of data processing. Threshold multi-party computation combines two techniques that bring different benefits: multi-party computation and threshold computing.

Multi-party computation improves security by enabling several, potentially distrusting, computation nodes to jointly compute a function over data (e.g., digitally signing a transaction or encrypting data with a secret key). The multi-party computation protocol guarantees that none of the computation nodes learns more than its input and the data shared amongst all the nodes. In practice, this allows to perform secret-key based cryptography while keeping the secret key hidden from each node. As a result, unlike in a standard cryptographic deployment, compromising a single node in a multi-party system will not reveal the secret key.

Threshold computing aims at increasing the reliability of a process. In threshold computing, a group of computer nodes (e.g., n number of computer nodes) is selected for performing a computation process (e.g., a data encryption process, a digital signature generation process, etc.), where at least a portion of the group of computer nodes (e.g., t number of computer nodes, where t is less than or equal to n) is required to successfully perform the computation process. In other words, the participation of any subset of the group of computer nodes would successfully perform the computation process as long as that subset reaches quorum, that is, includes t or more computer nodes. However, a subset of computer nodes would fail to perform the computation process if the subset includes less than t computer nodes.

Threshold multi-party computation (thereafter simply referred to as "multi-party computation" or "MPC") leverages both of the aforementioned techniques to improves both security and reliability of a computation process by requiring a minimum number of computer nodes to collaborate in the performance of the computation process, such that a breach of one or more of computer nodes (e.g., a computer node being attacked or hacked, etc.) from the group of computer nodes alone cannot defeat the authenticity and secrecy of the computation process (e.g., a malicious user cannot force the performance of the computation process even if the malicious has taken control over one or more computer nodes in the group of computer nodes, as long as less than t number of computer nodes are not taken over).

On the other hand, resiliency of the computation process is achieved by requiring only a portion of the group of selected computer nodes to successfully perform the computation process, such that the computation process would not fail if one or more nodes of the group of computer nodes become unavailable (e.g., power loss to the computer node, network issues, computer software issues, etc.).

Given the benefits and flexibility provided by multi-party computation, this computation approach can be useful in many different applications, especially in today's distributed environment. However, due to the complicated nature in implementing multi-party computation that involves collaboration of many computer nodes, it is a challenge to efficiently configure the deployment of such multi-party computation systems so that it best fits the targeted use and its environment. Thus, there is a need for providing a framework that enables multi-party computation to be widely available to users.

BRIEF DESCRIPTION OF THE FIGURES

FIG. 3 illustrates an example key distribution scheme according to an embodiment of the present disclosure;

Figure 1:
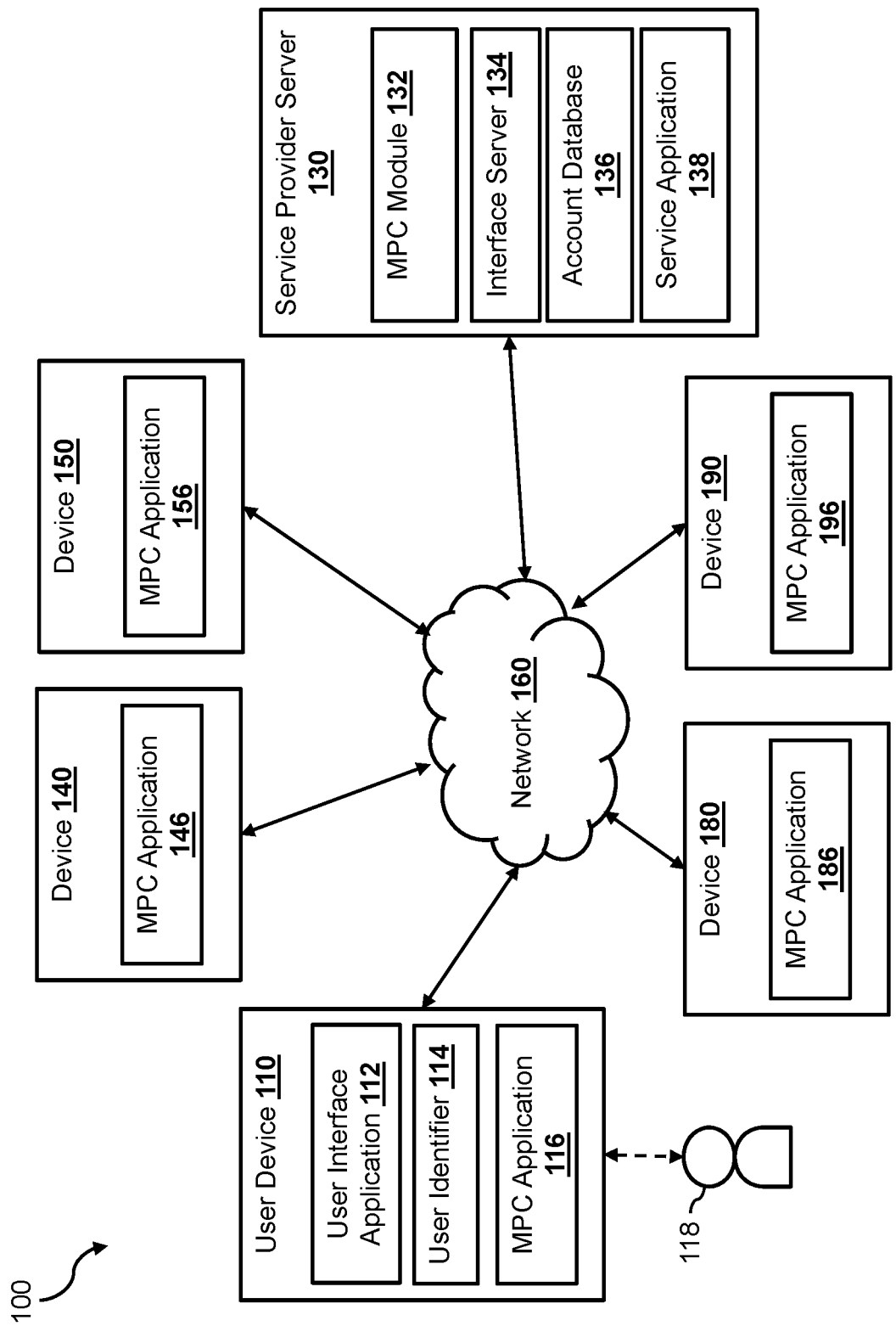
FIG. 1 is a block diagram illustrating a networked system that includes an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for providing a threshold multi-party computation (also referred to as "multi-party computation," "threshold MPC"," or "MPC") framework for dynamically configuring, deploying, and utilizing an MPC system for performing distributed computations in a reliable, secured, and efficient manner. As discussed above, the complicated nature in implementing an MPC system prevents such a system to be widely available to many users. Furthermore, due to the requirement of having multiple computer nodes participating in the performance of the computation process (and the more computer nodes required to be participating, the more secure and reliable is the computation process), the overall speed of performing the computation process can be greatly affected by various factors, such as networking conditions of various networks that connect the computer nodes, a processing load and capacity of the various computer nodes, distances between the computer nodes, geographical factors, and other factors. Thus, according to various embodiments of the disclosure, an MPC configuration system may automatically and dynamically configure, deploy, and utilize an MPC system for performing a computation process.

In some embodiments, the MPC configuration system may receive a request for deploying an MPC system for performing a specific computation process. For example, a user of a service provider may submit a request for configuring and deploying an MPC system for generating one or more digital signatures used to protect transactions (e.g., cryptocurrency transactions, fund transfer transactions, etc.). In another example, a user may submit a request for configuring and deploying an MPC system for encrypting sensitive data. The encrypted data may then be used for storage or transmission across unsecured networks. Since the user may have a limited number of computer devices (e.g., computer nodes) that can be used to participate in the computation process, the MPC configuration system may inquire the user about the computer devices that can be used as part of the MPC system. If the user is a natural person, the devices may include various user devices of the user (e.g., a smart phone, a laptop, a personal computer, a tablet, etc.), various user devices of other people who are associated with the user (e.g., a spouse's smart phone, a sibling's computer, a parent's tablet, etc.), smart appliances of the user at a secured location such as a home of the user, servers associated with a service provider (e.g., servers associated with the MPC configuration system, etc.), and possibly other devices. If the user is an organization, the devices may include servers that are under the control of the user, which may be located in different locations, user devices of certain decision-makers of the organization (e.g., a smart phone of the CEO of the organization, etc.), servers associated with a service provider (e.g., servers associated with the MPC configuration system, etc.), and possibly other devices.

The MPC configuration system may then determine a security requirement and a resiliency requirement based on the request. For example, the MPC configuration system may determine the security requirement and the resiliency requirement based on a type of usage of the output from the MPC system. For example, if the request is for configuring an MPC system for generating digital signatures used in performing electronic transactions, the MPC configuration system may determine the security requirement based on the type of electronic transactions, an average amount associated with the electronic transactions, the type of data being accessed for the electronic transactions, etc. In some embodiments, the MPC configuration system may determine the resiliency requirement based on attributes of the devices used as the computer nodes for the computation process. For example, the MPC configuration system may determine a lower resiliency requirement for the MPC system when the devices selected for the MPC system are reliable (e.g., server devices configured to be powered on permanently) and may determine a higher resiliency requirement for the MPC system when the devices selected for the MPC system are not reliable (e.g., personal computers that may be powered off, appliances that may be taken offline, etc.).

In some embodiments, the MPC configuration system may determine networking characteristics associated with the selected computer nodes for the MPC system, and may determine the security requirement and the resiliency requirement further based on the networking characteristics. For example, the MPC configuration system may perform a set of network tests by transmitting data to the selected computer nodes and receiving data (e.g., acknowledgement of receiving the transmitted data) from the computer nodes. The MPC configuration system may determine network characteristics (e.g., latency, transmission failure rates, etc.) of each of the computer nodes. In some embodiments, the MPC configuration system may perform multiple network tests over a period of time (e.g., different times within a day, over a week, etc.) to determine the network characteristics of each of the computer nodes.

Based on the network characteristics of each of the computer nodes, the MPC configuration system may determine (or adjust) the security requirement and/or resiliency requirement for the MPC system. For example, when the network characteristics indicate that the network connections with the computer nodes are reliable (e.g., latency below a threshold, failure rates below a threshold, etc.), the MPC configuration system may determine a lower resiliency requirement. Conversely, when the network characteristics indicate that the network connections with the computer nodes are not reliable (e.g., latency above a threshold, failure rates above a threshold, etc.), the MPC configuration system may determine a higher resiliency requirement.

In some embodiments, based on device attributes of the various devices identified by the user for use in the MPC system, the MPC configuration system may eliminate one or more of the devices from the MPC system and/or add one or more devices to the MPC system. The MPC configuration system may use a number of criteria to characterize a node in a MPC system or the MPC system as a whole. For instance, one requirement could be to ensure that selected nodes belong to at least two different cloud providers (to promote hybrid cloud operation). Other criteria could be that nodes located in a certain country be required (or excluded). In other instances, the MPC configuration system may identify devices that have security features below a threshold (e.g., devices with outdated operating system, devices without security features, etc.). In some embodiments, based on the security requirement and the resiliency requirement for the MPC system, the MPC configuration system may select a total number (n) of computer nodes to be included in the MPC system, and a minimum number (1) of required computer nodes for successfully performing the computation process. For example, when the security requirement is high (above a threshold), a larger portion (or the entire portion) of the devices identified by the user would be selected as the group of computer nodes to be part of the MPC system. When the security requirement is low (below a threshold), a smaller portion of the devices identified by the user would be selected as the group of computer nodes for the MPC system. Furthermore, the MPC configuration system may select a higher minimum number of required computer nodes (1) when the resiliency requirement is low (and when the security requirement is high), and may select a lower minimum number of required computer nodes (1) when the resiliency requirement is high (and when the security requirement is low).

In some embodiments, the MPC configuration system may determine whether an application (e.g., an MPC application) is installed on each of the computer nodes in the group. If an MPC application is not installed on a computer within the group, the MPC configuration system may deploy an MPC application in the computer node. The MPC configuration system may then configure the MPC application of each of the computer nodes in the group to perform a corresponding sub-routine within the computation process for the MPC system.

Based on the total number of computer nodes (n) and the minimum number of computer nodes (1) determined for the MPC system, the MPC configuration system may determine how cryptographic secrets, such as digital encryption keys (also referred to as "keys"), can be generated and distributed among the group of computer nodes. For example, in order to ensure that any combinations (subgroups) of computer nodes having at least t number of nodes will successfully perform the computation process, a total of $$\binom{n}{t-1}$$

number of keys is required to be generated and distributed among the group of n computer nodes, where each computer node may receive $$\binom{n-1}{t-1}$$

number of keys. In order to successfully perform the computation process, all of the keys (the entire set of keys) are needed. In some embodiments, the MPC configuration system may determine a distribution scheme of the keys such that any subgroup of the group of computer nodes having at least t number of computer nodes will have possession of the entire set of keys to perform the computation process. The distribution scheme may specify which keys are assigned to each computer node in the group of computer nodes. The combination of keys assigned to each computer node should be unique to maintain the security of the MPC system, such that a breach of any one computer node does not compromise another computer node within the MPC system.

Two approaches can be adopted in generating and distributing the keys among the group of computer nodes. Under a centralized key distribution approach, keys are generated by a central authority, such as the MPC configuration system (or a third-party key generation system). After generating the keys, the MPC configuration system may then distribute the keys among the group of computer nodes according to the distribution scheme. For example, the MPC configuration system may transmit a distinct combination of keys to each computer node in the group according to the key distribution scheme.

Under a decentralized key distribution approach, keys are generated among the group of computer nodes. For example, the MPC configuration system may determine a first computer node within the group of computer node. The MPC configuration system may instruct the first computer node to generate keys that have been assigned to the first computer node. The MPC configuration system may also instruct the first computer node to transmit one or more keys, that the first computer node generated and are assigned to other computer nodes, to the other computer nodes. The MPC configuration system may then instruct a second computer node from the group of computer nodes to generate keys that are assigned to the second computer node and are not already in its possession. After generating the new keys, the MPC configuration system may instruct the second computer node to transmit one or more of the generated keys, that the second computer node generated and are assigned to other computer nodes except the first computer node, to the other computer nodes. The MPC configuration system may continue to instruct other computer nodes to generate new keys and distribute the newly generated keys until the entire set of keys associated with the MPC system is generated and distributed among the group of computer nodes.

The centralized key distribution approach is simpler to implement than the decentralized distribution approach. However, unlike the centralized approach, the decentralized distribution scheme does not need to rely on a single entity that needs to be trusted and can be viewed as a single point of failure (or attack). Moreover, the decentralized distribution approach requires less data transmission across a network. As the time it takes to transmit data across a network is substantially larger than the time it takes to generate a key, the greater number of data transmission required to distribute the key would substantially reduce the speed of the key generation and distribution process. As such, the MPC configuration system may adopt the centralized key distribution approach when the minimum number of computer nodes (1) required to perform the computation process is below a threshold number (e.g., 3, 5, 10, etc.) (which translates to a small number of keys assigned to each of the computer nodes). However, when the minimum number of computer nodes (1) required to perform the computation process is above the threshold (which translates to a large number of keys assigned to each of the computer nodes), the MPC configuration system may adopt the decentralized key distribution approach as it provides a much shorter processing time for generating and distributing the keys to the group of computer nodes.

Once the keys are generated and distributed among the group of computer nodes associated with the MPC system, the MPC system is ready to perform the computation process based on a collaboration among at least a portion of the group of computer nodes. Similar to the distribution of keys, there are multiple different approaches in performing the computation process among the computer nodes. For example, one approach is using a cascade method to perform the computation process. Using the cascade method, a succession of sub-routines (e.g., encryption routines) are performed sequentially in a specific order. For example, when the computation process includes a process to encrypt plaintext data, the plaintext data must first be encrypted using a first key in the set of keys to generate a first output. The first output is then encrypted using a second key in the set of keys to generate a second output. Thus, each output from a previous routine using a previous key undergoes a current routine using a current key, until the output is processed using the last key in the set of keys. Since each sub-routine is dependent on the output of a previous sub-routine (or the initial plaintext data), the sub-routines must be performed in series according to an order.

Another example approach of performing the computation process is using an XOR method to perform the computation process. In order to use the XOR method to perform the computation process, a nonce is generated. In some embodiments, a different and unique nonce is generated every time the MPC system is requested to perform the computation process using the XOR method. For example, the nonce may be generated using a random number generator. Each participating computer node may encrypt the nonce using the key(s) in its possession. The plaintext data is XORed with the output of encrypting the nonce using the distinct keys. Thus, if there is a total of ten keys, the plaintext data is XORed ten times using the different output generated by encrypting the nonce using each of the ten keys. All of the XORed values (e.g., the values generated by performing an XOR operation between the plaintext data and each of the keys) are XORed together to produce the final output.

As such, the speed of performing the computation process under the cascade approach is highly dependent on the network conditions of the computer nodes and the minimum number of required computer nodes (1), while the speed of performing the computation process under the XORed method only depends on the number of keys distributed among the group of computer nodes. In some embodiments, to optimize the performance of the MPC system, the MPC configuration system may configure the MPC system to perform the computation process using the cascade method when the networking conditions associated with the group of computer nodes are good (e.g., latency and failure rate below a threshold, etc.) and that the minimum number of required computer nodes (1) is low (e.g., below a threshold value such as 3, 5, 10, etc.). Conversely, the MPC configuration system may configure the MPC system to perform the computation process using the XOR method when the networking conditions associated with the group of computer nodes are not ideal (e.g., latency and failure rate above the threshold, etc.) or the minimum number of required computer nodes (1) is high (e.g., above a threshold value such as 3, 5, 10, etc.). In some embodiments, since the network conditions associated with the computer nodes may change (e.g., based on a location of the computer node, a network traffic condition, etc.), the MPC configuration system may perform a network test for the group of computer nodes after receiving a request to perform the computation process, and may dynamically determine an approach (e.g., the cascade approach or the XOR approach) for performing the computation process for the request based on the network conditions determined for the group of computer nodes in real-time.

In some embodiments, when a cascade approach is adopted in performing the computation process, the MPC configuration system may also determine an order in which the participating computer nodes perform the sub-routines. Since the set of sub-routines have to be performed sequentially in a specific order and some of the computer nodes may have overlapping keys in their possessions, the computation process may be performed using different combinations (and/or different orders) of computer nodes. In an example where the first key is distributed to both a first computer node and a second computer node, the MPC configuration system may instruct either the first computer node or the second computer node to begin the computation process (e.g., by performing a first sub-routine using the first key). However, if the first computer node also has in its possession a second key while the second computer node does not have the second key, instructing the first computer node to begin the computation process may eliminate one data transmission across the network, as the first computer node can perform the first sub-routine using the first key and the second sub-routine using the second key without transmitting any data to another computer node, while the second computer node has to transmit an output from performing the first sub-routine to another computer node for performing the second sub-routine. Thus, the MPC configuration system of some embodiments may analyze the distribution of the keys, the identity of participating computer nodes for performing the computation process for the request, and the network conditions associated with the participating computer nodes. The MPC configuration system may then configure an order of the computer nodes for performing the computation process based on the analysis to achieve an optimal result (e.g., the fastest time for performing the computation process).

FIG. 1 illustrates a networked system 100, within which the MPC configuration system may be implemented according to one embodiment of the disclosure. Note that the present techniques may be applied in many different computing and technological environments, however, and are not limited to those shown in the figures. The networked system 100 includes a service provider server 130, a user device 110, and devices 140, 150, 180, and 190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 118 to interact with the service provider server 130 over the network 160. The user 118 may be a natural person or an entity (e.g., a corporation, a partnership, an organization, etc.). For example, the user 118 may use the user device 110 to conduct an online transaction with a third-party server, such as a merchant server associated with a merchant, via websites hosted by, or mobile applications associated with, the third-party server. The user 118 may also log in to a user account to access account services or conduct electronic transactions (e.g., account transfers, payment transactions, data access transactions, data encryption transactions, cryptocurrency transactions, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 118 to interact with the service provider server 130, any third-party servers, and devices 140, 150, 180, and 190 over the network 160. In one implementation, the user interface application 112 includes a software program (e.g., a mobile application) that provides a graphical user interface (GUI) for the user 118 to interface and communicate with the service provider server 130, third-party servers, and/or other devices 140, 150, 180, and 190 via the network 160. In another implementation, the user interface application 112 includes a browser module that provides a network interface to browse information available over the network 160. For example, the user interface application 112 may be implemented, in part, as a web browser to view information available over the network 160.

The user device 110 may include an MPC application 116 that implements at least a portion of an MPC system disclosed herein. In the scenario where the user device 110 is selected as one of the computer nodes for performing the computation process for an MPC system as disclosed herein, the MPC application 116 may be configured to receive one or more keys (e.g., from the service provider server 130), and to store the keys in a data storage of the user device 110. Upon receiving a computation request (e.g., from the service provider server 130), the MPC application 116 may be configured to perform one or more sub-routines of the computation process using one or more keys stored on the user device 110 and produce an output. The MPC application 116 may then transmit the output to another computer node (if the output is an intermediate output) or transmit the output back to the service provider server 130 if the output is a final output. In some embodiments, the sub-routine(s) performed by the MPC application 116 may be based (e.g., dependent) on another output generated by another computer node performing a sub-routine corresponding to the other computer node.

The user device 110, in one embodiment, may include at least one identifier 114, which may be implemented, for example, as operating system registry entries, cookies associated with the user interface application 112 and/or the authentication application 116, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user 140 with a particular user account (e.g., and a particular profile) maintained by the service provider server 130.

In various implementations, the user 118 is able to input data and information into an input component (e.g., a keyboard) of the user device 110. For example, the user 118 may use the input component to interact with the UI application 112 (e.g., to retrieve content from third-party servers, to provide inputs related to a goal to the service provider server 130, etc.).

While only one user device 110 is shown in FIG. 1, it has been contemplated that multiple user devices, each associated with a different user account with the service provider server 130, may be connected to the user device 110, other devices 140, 150, 180, and 190, and the service provider server 130 via the network 160.

The service provider server 130, in one embodiment, may be maintained by a transaction processing entity or an online service provider, which may provide processing for electronic transactions between the users of the user device 110 and one or more merchants or other types of payees, and/or perform cryptocurrency transactions. As such, the service provider server 130 may include a service application 138, which may be adapted to interact with the user device 110, and/or third-party servers (e.g., a server that maintains a blockchain ledger for a cryptocurrency, etc.) over the network 160 to facilitate the searching, selection, purchase, payment of items, transaction authentication, cryptocurrency transactions, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities (e.g., between two users, etc.) and/or cryptocurrency transactions (e.g., transferring funds in a cryptocurrency between wallets, etc.). In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application, the MPC application, etc.) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various services provided by the service provider server 130. The interface server 134 may also include other electronic pages associated with the different services (e.g., electronic transaction services, etc.) offered by the service provider server 130. As a result, a user (e.g., the user 118, etc.) may access a user account associated with the user and access various services offered by the service provider server 130 (e.g., conduct various transactions such as payment transactions, data access transactions through a user account of the user), by generating HTTP requests directed at the service provider server 130.

The service provider server 130, in one embodiment, may be configured to maintain one or more user accounts and merchant accounts in an account database 136, each of which may be associated with a profile and may include account information associated with one or more individual users (e.g., the user 118 associated with user device 110, etc.) and merchants. In one implementation, a user may have credentials to authenticate or verify identity with the service provider server 130. Thus, the service provider server may store the credentials of the users in corresponding records of the account database 136 associated with the user accounts.

In various embodiments, the service provider server 130 includes an MPC module 132 that implements at least a portion of the MPC configuration system as discussed herein. The MPC module 132 may be configured to dynamically configure, deploy, and utilize one or more MPC systems for performing multi-party computations, such as data encryption, digital signature encryption, etc. The MPC module 132 may receive a request for deploying an MPC system for a user. For example, the user 118 may register, via the user device 110, a new user account with the service provider server 130 such that the user 118 may perform transactions (e.g., cryptocurrency transactions, payment transactions, etc.) through the user account. In some embodiments, the performance of certain transactions may require certain computation processes such as encryption of certain data (e.g., transaction data, etc.) and/or generation of a digital signature for the user 118 such that the transactions can be authenticated. Instead of relying solely on the user device 110 (or the service provider server 130) to perform the computation processes, which may be prone to single point of attack or failure, the MPC module 132 may configure and deploy an MPC system for the user account for performing the computation processes using a multi-party computation approach.

In some embodiments, the MPC module 132 may determine a set of configurations that is customized for the MPC system based on the request, the type of computations that the MPC system is requested to perform, the usage of the output from the computations, device and network attributes associated with computer nodes that are available to be used for the MPC system. The set of configurations may include a total number of computer nodes (n) (and which devices are included as the group of computer nodes) to be used as part of the MPC system, a minimum number of computer nodes (1) required to perform the computation, a key distribution scheme, a key distribution approach, and a computation approach. Once the set of configurations is determined, the MPC module 132 may deploy the MPC system by generating keys and distributing the keys to the group of computer nodes (e.g., the user device 110 and devices 140, 150, 180, and 190) based on the key distribution scheme.

Upon receiving a subsequent request for performing the computation (e.g., a transaction request initiated by the user 118 that requires the computation such as encryption of data or generation of a digital signature for the account), the MPC module 132 may instruct the computer nodes 110, 140, 150, 180, and 190 (e.g., via the respective MPC applications 116, 146, 156, 186, and 196) to perform the corresponding sub-routines for the computation process. The collaboration of the computer nodes (when at least t number of computer nodes participating in the computation process) would generate an output corresponding to the computation process. The MPC module 132 may provide the output to the service application 138 to complete a transaction. For example, the transaction may be a cryptocurrency transaction, and the output may represent a digital signature of the user account of the user 118. Thus, the service application 138 may use the digital signature to generate a block to record the cryptocurrency transaction in a ledger. In another example, the transaction may be a payment transaction that requires certain transaction data to be encrypted before transmitting the encrypted data to a remote server, and the output of the computation process may represent the encrypted data. The service application 138 may transmit the output to the remote server to complete the payment transaction.

Each of the devices 140, 150, 180, and 190 can be a user device that is substantially similar to the user device 110 or a computer server. Each of the devices 140, 150, 180, and 190 may also include a corresponding MPC application (e.g., the MPC applications 146, 156, 186, and 196) configured to perform multi-party computation functionalities for the corresponding device as disclosed herein.

Figure 2:
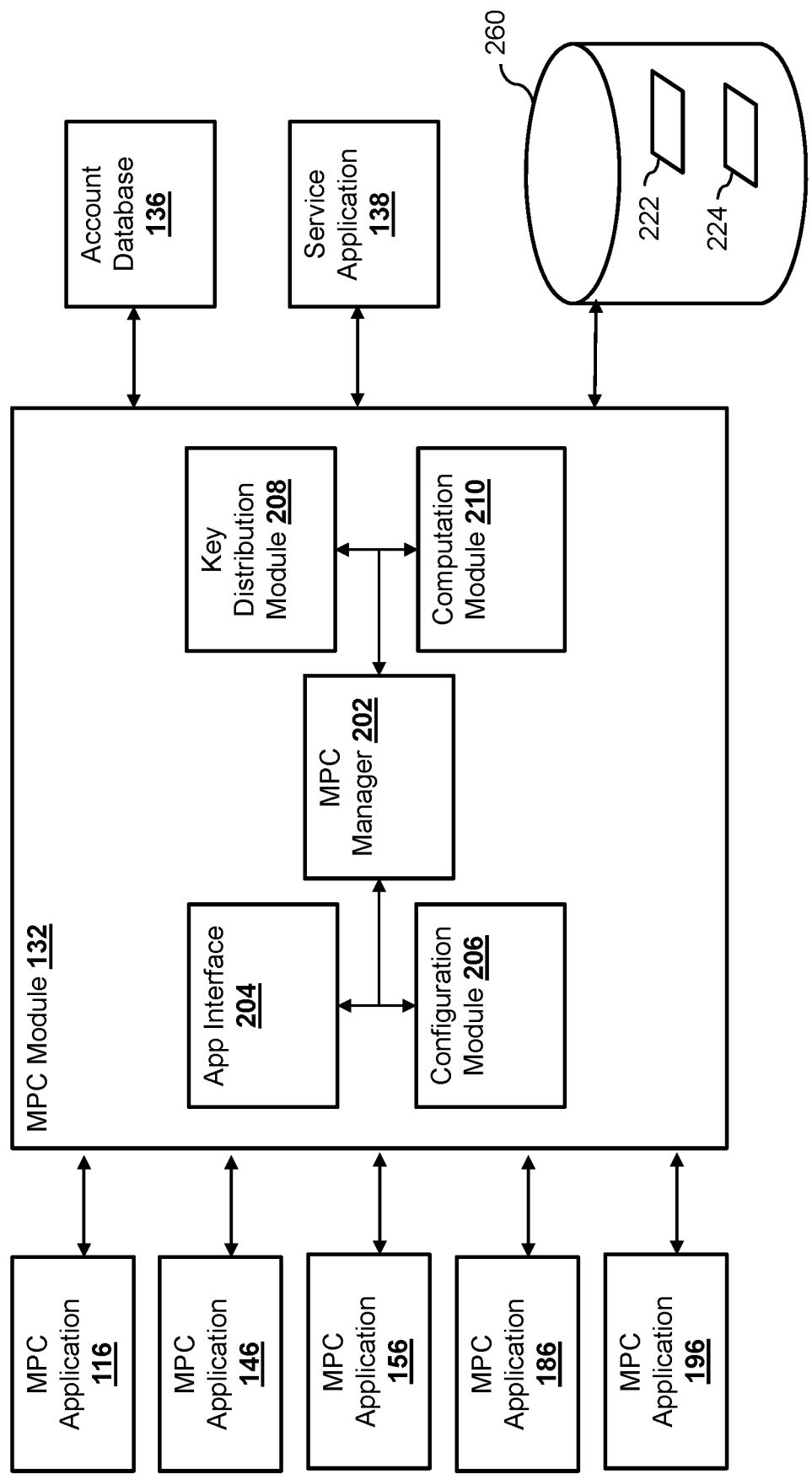
FIG. 2 is a block diagram illustrating an MPC module according to an embodiment of the present disclosure.

FIG. 2 illustrates a block diagram of the MPC module 132 according to an embodiment of the disclosure. The MPC module 132 includes an MPC manager 202, an application interface 204, a configuration module 206, a key distribution module 208, and a computation module 210. In some embodiments, the MPC module 132 may be communicatively coupled to MPC applications installed on various devices that are part of the group of computer nodes of an MPC system, such as the MPC applications 116, 146, 156, 186, and 196 of the user device 110, the device 140, the device 150, the device 180, and the device 190, respectively. The MPC module 132 may configure and/or collaborate with the MPC applications 116, 146, 156, 186, and 196 to perform the computation process as discussed herein.

The MPC manager 202 may receive a request to configure and deploy an MPC system. For example, when a user (e.g., the user 118) registers a new user account with the service provider server 130, the service application 138 may submit a request to the MPC module 132 for creating an MPC system for the user account. The MPC system that is set up for the user account may be configured to perform certain computations (e.g., data encryption, digital signature generation, etc.) for the user account to facilitate certain electronic transactions conducted through the user account.

In some embodiments, the MPC manager 202 may inquire, through an interface provided on the user device 110 of the user 118, devices that are available to be part of the MPC system to perform the computation process. The MPC manager 202 may receive identifiers of devices, such as Internet Protocol (IP) addresses of devices, media access control (MAC) addresses of the devices, or other information that can identify the devices. In this example, the MPC manager 202 may receive, from the user device 110, identifiers that identify the user device 110 and the devices 140, 150, 180, and 190 as available computer nodes for the MPC system.

In some embodiments, since the devices identified by the user 118 may include a variety of different devices such as user devices of the user or people associated with the user, servers associated with the user, appliances associated with the user, etc., the MPC manager 202 may access the identified devices to determine device attributes of the devices. The attributes may include a type of device (e.g., a smart phone, an appliance, a tablet, a personal computer, a server, etc.), an operating system executed on the device (e.g., an Apple OS X®, a Microsoft Windows 10, a Raspberry Pi operating system, etc.), any security software installed on the device, etc. In some embodiments, based on the device attributes, the MPC manager 202 may eliminate one or more devices from being considered as part of the MPC system, for example, because of reasons such as lack of security features, lack of processing capacity, lack of memory capacity, etc. In this example, the MPC manager 202 may determine that all of the devices (e.g., the user device 110, the devices 140, 150, 180, and 190) may be included as the group of computer nodes associated with the MPC system. In some embodiments, the MPC manager 202 may also include the service provider server 130 (and other servers associated with the service provider server 130) as part of the group of computer nodes for the MPC system.

After determining the devices as part of the MPC system, the MPC manager 202 may, for any of the devices that has not installed an MPC application, install an MPC application on the device. The MPC manager 202 may then use the configuration module 206 to configure the MPC system. For example, the configuration module 206 may first determine a total number of computer nodes (n) for the MPC system and the minimum number of computer nodes (1) required for performing the computation process. In some embodiments, the configuration module 206 may determine the total number of computer nodes (n) for the MPC system and the minimum number of computer nodes (1) required for performing the computation process based on a security requirement and a resiliency requirement of the MPC system. The configuration module 206 may determine a higher total number of computer nodes (n) and/or a higher minimum number of computer nodes (1) required for performing the computation process based on a high security requirement. The configuration module 206 may determine a lower required computer node to total computer node ratio (t:n) based on a high resiliency requirement. Conversely, the configuration module 206 may determine a lower total number of computer nodes (n) and/or a lower minimum number of computer nodes (1) required for performing the computation process based on a low security requirement. The configuration module 206 may also determine a higher required computer node to total computer node ratio (t:n) based on a low resiliency requirement.

In some embodiments, the configuration module 206 may determine a higher security requirement for the MPC system when the type of transactions used by the output of the computation process has high risk (e.g., transactions of fund above a threshold amount, cryptocurrency transactions that are not reversible, data transactions involving sensitive data, etc.) and may determine a lower security requirement for the MPC system when the type of transactions used by the output of the computation process has low risk (e.g., transactions of fund below the threshold amount, data transactions involving non-sensitive data, etc.). In this example, the configuration module 206 may determine a total number of five computer nodes (e.g., n=5) and a minimum number of three computer nodes (e.g., t=3) required for performing the computation process for the MPC system for the user account based on the security requirement and the resiliency requirement specific associated with the user account.

The configuration module 206 may then determine a key distribution scheme for the MPC system. For example, in order to have any subgroup of three or more computer nodes, from the five computer nodes, to successfully perform the computation process, the configuration module 206 determine that ten keys (e.g., $$\binom{5}{3-1} = 10$$

are required to be generated, and that each computer node is required to possess six keys $$\left(\text{e.g., } \binom{5-1}{3-1} = 6\right).$$

Each key may be an encryption key that can be used to perform an encryption process to transform plaintext data into encrypted data based on a particular encryption algorithm. The configuration module 206 may then determine a distribution scheme for distributing ten different keys to the group of five computer nodes such that each computer node has six keys and any combination of three computer nodes from the five computer nodes would produce the entire set of ten keys.

Figure 3:
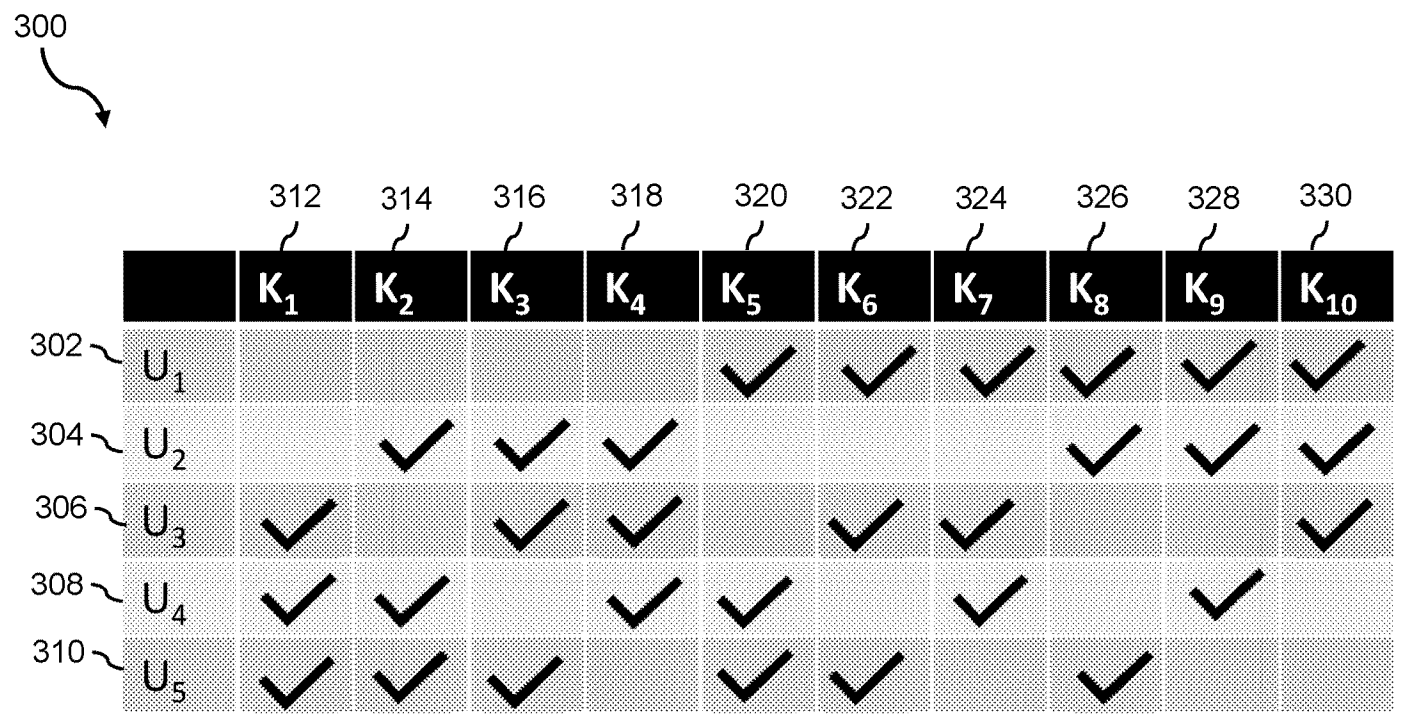

FIG. 3 illustrates an example key distribution scheme 300 for the MPC system, determined by the configuration module 206. In this example, the MPC system includes five computer nodes, where any three or more computer nodes from the five computer nodes should be capable of performing the computation process. As a result, the MPC system needs ten different keys, where each computer node has a different combination of six keys. The computation process requires the performance of sub-routines using all of the ten keys. Thus, the ten keys need to be distributed among the computer nodes such that any combination of three or more computer nodes would have possession of the entire set of ten keys.

The key distribution scheme 300 is presented as a table, having five rows 302-310 representing the five computer nodes and ten columns 312-330 representing ten keys. Each row in the five rows 302-310 represents a distinct computer node from the five computer nodes ($U_1$ to $U_5$) for the MPC system, and each column in the ten columns 312-330 represents a distinct key from the ten keys ($K_1$ to $K_{10}$). The five computer nodes $U_1$ to $U_5$ may represent the devices selected to be part of the MPC system for the user account, such as the user device 110, and the devices 140, 150, 180, and 190. A check mark that appears at the intersection between a row and a column indicates that the corresponding key should be assigned to the corresponding computer node. Thus, according to the key distribution scheme 300, the computer node $U_1$ is assigned with keys $K_5$, $K_6$, $K_7$, $K_8$, $K_9$, and $K_{10}$ according to the check marks in the row 302, the computer node $U_2$ is assigned with keys $K_2$, $K_3$, $K_4$, $K_8$, $K_9$, and $K_{10}$ according to the check marks in the row 304, the computer node $U_3$ is assigned with keys $K_1$, $K_3$, $K_4$, $K_6$, $K_7$, and $K_{10}$ according to the check marks in the row 306, the computer node $U_4$ is assigned with keys $K_1$, $K_2$, $K_4$, $K_5$, $K_7$, and $K_9$ according to the check marks in the row 308, and the computer node $U_5$ is assigned with keys $K_1$, $K_2$, $K_3$, $K_5$, $K_6$, and $K_8$ according to the check marks in the row 310.

The key distribution module 208 may initiate the generation and distribution of the keys according to the key distribution scheme 300. As discussed herein, keys can be generated and distributed using one of two different approaches: a centralized key distribution approach and a decentralized key distribution approach. Under the centralized key distribution approach, the key distribution module 208 is configured to generate all of the keys for an MPC system. Thus, in this example, the distribution module 208 may generate the encryption keys $K_1$ to $K_{10}$. After generating the keys, the key distribution module 208 may distribute the keys $K_1$-$K_{10}$ among the group of computer nodes $U_1$ to $U_5$ according to the distribution scheme 300. For example, the key distribution module 208 may transmit keys $K_5$, $K_6$, $K_7$, $K_8$, $K_9$, and $K_{10}$ to the computer node $U_1$, may transmit the keys $K_2$, $K_3$, $K_4$, $K_8$, $K_9$, and $K_{10}$ to the computer node $U_2$, may transmit the keys $K_1$, $K_3$, $K_4$, $K_6$, $K_7$, and $K_{10}$ to the computer node $U_3$, may transmit the keys $K_1$, $K_2$, $K_4$, $K_5$, $K_7$, and $K_9$ to the computer node U4, and may transmit the keys $K_1$, $K_2$, $K_3$, $K_5$, $K_6$, and $K_8$ to the computer node $U_5$.

Under the decentralized key distribution approach, on the other hand, instead of generating the keys by the MPC module 132, the keys are generated among the group of computer nodes $U_1$ to $U_5$. For example, the key distribution module 208 may initially instruct the computer node $U_1$ to generate keys that have been assigned to the computer node $U_1$ according to the key distribution scheme 300, namely the keys $K_5$, $K_6$, $K_7$, $K_8$, $K_9$, and $K_{10}$. The key distribution module 208 may then instruct (e.g., via the app interface 204) the computer node $U_1$ (e.g., the MPC application of the computer node $U_1$) to distribute the generated keys to other computer nodes that have been assigned with the corresponding key(s) accordingly to the key distribution scheme 300. For example, the computer node $U_1$ may transmit the keys $K_8$, $K_9$, and $K_{10}$ to the computer node $U_2$, may transmit the keys $K_6$, $K_7$, and $K_{10}$ to $U_3$, may transmit the keys $K_5$, $K_7$, and $K_9$ to the computer node $U_4$, and may transmit the keys $K_5$, $K_6$, and $K_8$ to the computer node $U_5$. The key distribution module 208 may instruct another computer node (e.g., the computer node $U_2$) to generate keys that have been assigned to the computer node $U_2$ but are not yet in its possession. In this example, the computer node $U_2$ is assigned with the keys $K_2$, $K_3$, $K_4$, $K_8$, $K_9$, and $K_{10}$. However, the keys $K_8$, $K_9$, and $K_{10}$ are already in possession by the computer node $U_2$ based on the transmission of the keys $K_8$, $K_9$, and $K_{10}$ from the computer node $U_1$. Thus, the computer node $U_2$ only needs to generate the remaining keys $K_2$, $K_3$, $K_4$. After generating the remaining keys $K_2$, $K_3$, and $K_4$, the key distribution module 208 may instruct the computer node $U_2$ to transmit the newly generated keys $K_2$, $K_3$, and $K_4$ to other computer nodes (except the computer node $U_1$) according to the key distribution scheme 300. For example, the computer node $U_2$ may transmit the keys $K_3$ and $K_4$ to the computer node $U_3$, may transmit the keys $K_2$ and $K_4$ to the computer node $U_4$, and may transmit the keys $K_2$ and $K_3$ to the computer node $U_5$.

The key distribution module 208 may instruct another computer node (e.g., the computer node $U_3$) to generate keys that have been assigned to the computer node $U_3$ but are not yet in its possession. In this example, the computer node $U_3$ is assigned with the keys $K_1$, $K_3$, $K_4$, $K_6$, $K_7$, and $K_{10}$. However, the keys $K_3$, $K_4$, $K_6$, $K_7$, and $K_{10}$ are already in possession by the computer node $U_3$ based on the transmission of the keys $K_8$, $K_9$, and $K_{10}$ from the computer node $U_1$ and the transmission of the keys $K_3$ and $K_4$ from the computer node $U_2$. Thus, the computer node $U_3$ only needs to generate the remaining key $K_1$. After generating the remaining key $K_1$, the key distribution module 208 may instruct the computer node $U_3$ to transmit the newly generated key $K_1$ to other computer nodes (except the computer nodes $U_1$ and $U_2$) according to the key distribution scheme 300. For example, the computer node $U_3$ may transmit the key $K_1$ to both of the computer nodes $U_4$ and $U_5$. In some embodiments, since the generation and transmission of the keys by the computer nodes $U_1$, $U_2$, and $U_3$, are independent from each other, the key distribution module 208 may instruct these computer nodes to generate and distribute the corresponding keys in parallel to improve the performance speed of the key distribution process. Based on the generation and the distribution of the keys by the computer nodes $U_1$, $U_2$, and $U_3$, the entire set of ten keys $K_1$ to $K_{10}$ are generated and distributed among the computer nodes $U_1$ to $U_5$ according to the key distribution scheme 300.

Figure 4:
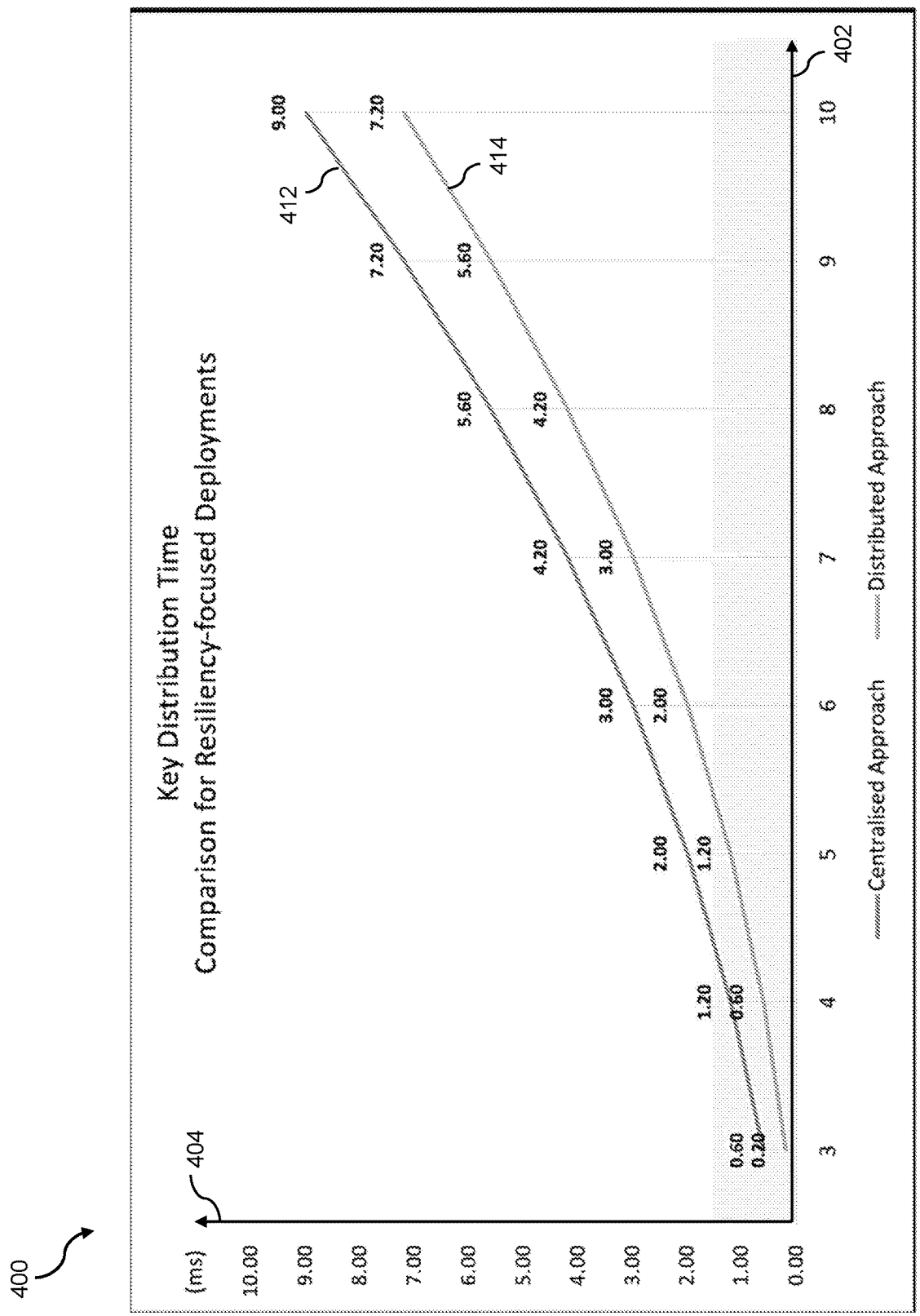
FIG. 4 illustrates a graph that compares the key distribution performance between the centralized approach and the decentralized approach according to an embodiment of the present disclosure.
Figure 5:
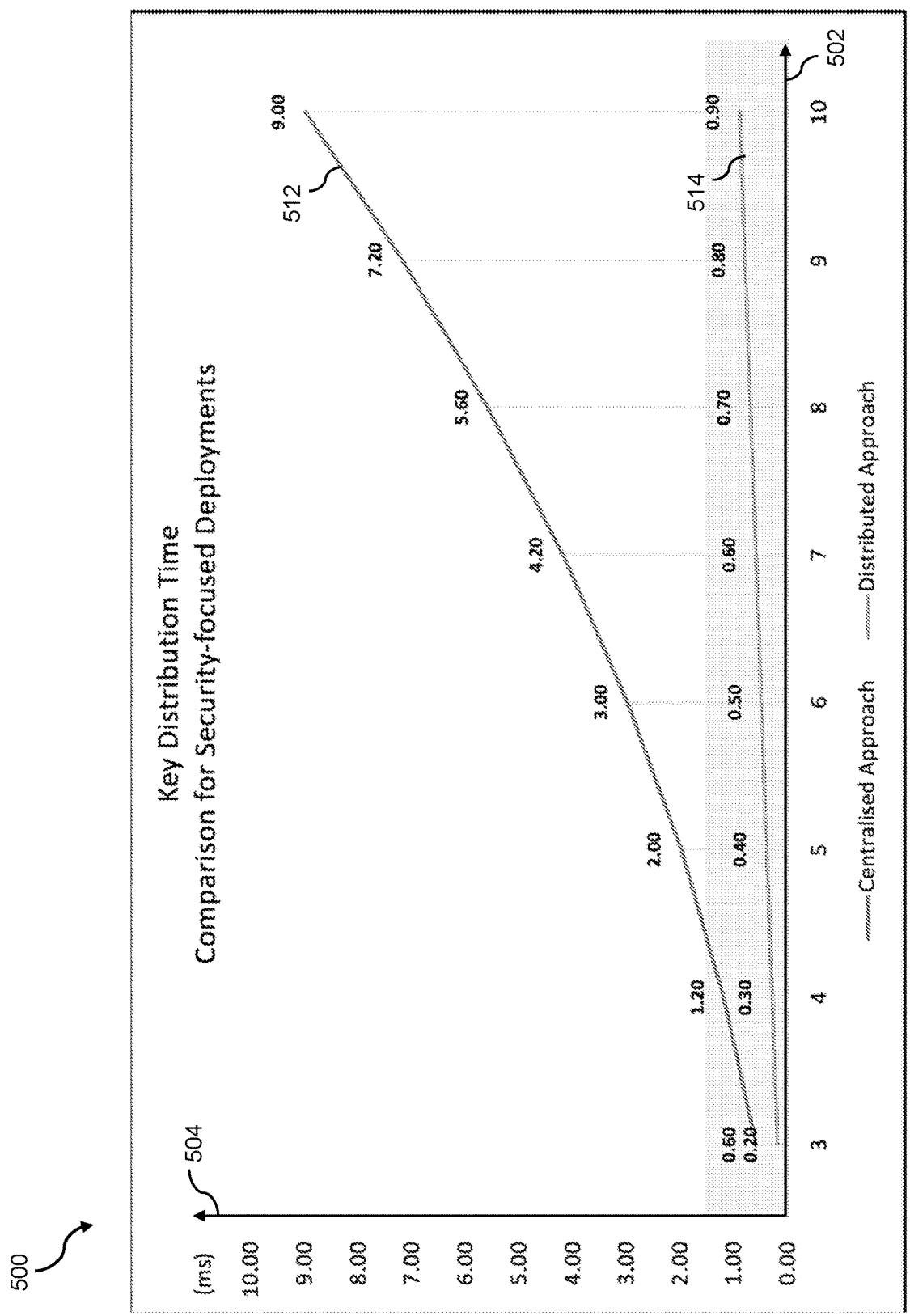
FIG. 5 illustrates another graph that compares the key distribution performance between the centralized approach and the decentralized approach according to an embodiment of the present disclosure.
Figure 6:
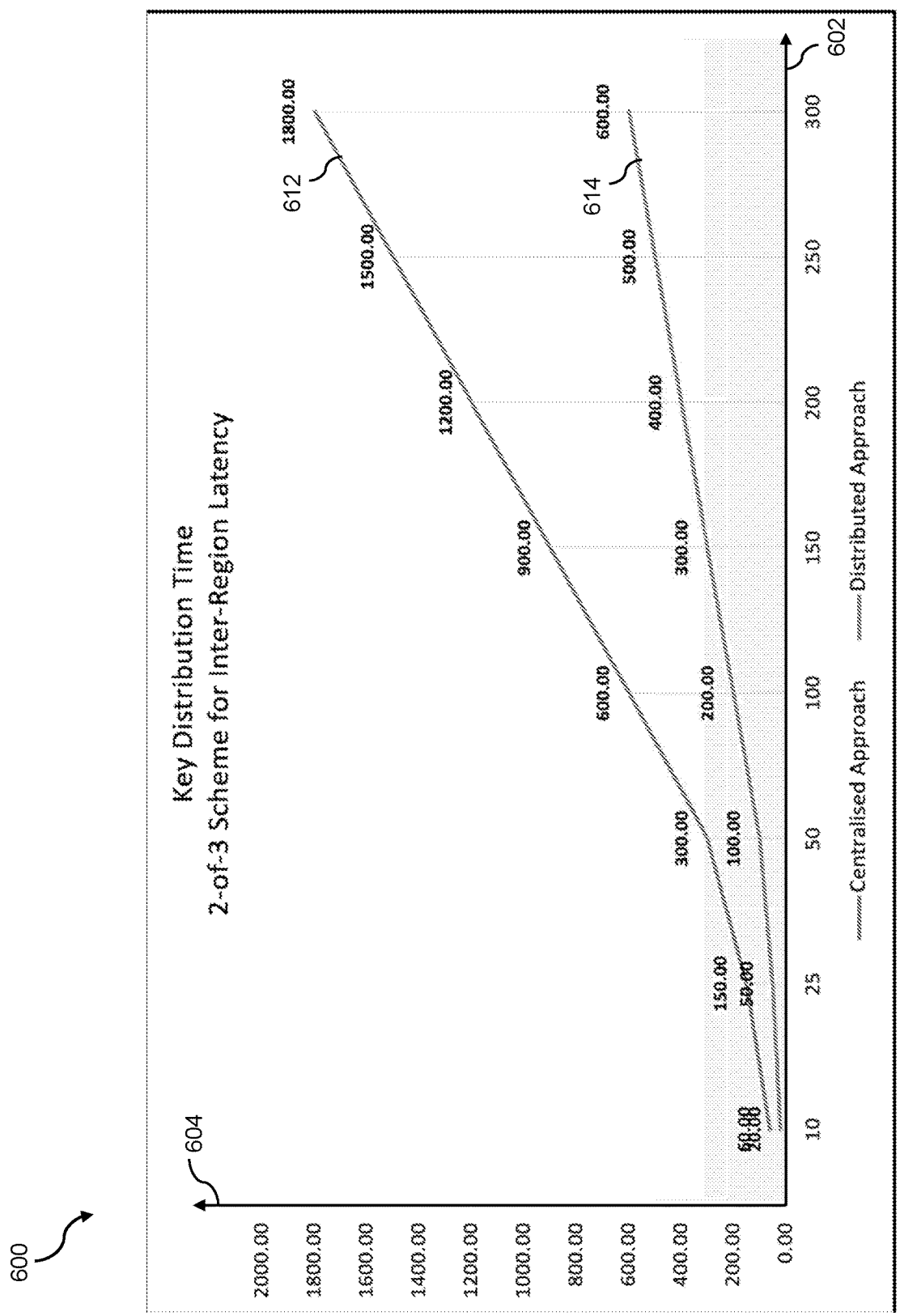
FIG. 6 illustrates another graph that compares the key distribution performance between the centralized approach and the decentralized approach according to an embodiment of the present disclosure.

The centralized key distribution approach is simpler to implement than the decentralized distribution approach. However, the decentralized distribution approach requires less data transmission across a network. As the time it takes to transmit data across a network is substantially larger than the time it takes to generate a key, the greater number of data transmission required to distribute the key would substantially reduce the speed of the key generation and distribution process. FIGS. 4-6 illustrate various graphs that represent comparisons of key distribution performance between the centralized approach and the decentralized approach under different circumstances. To model the time required to generate and distribute the keys, the following equations are used. Equation (1) represents the time required to generate and distribute the keys under the centralized approach:

$$\text{Time} = C_{t-1}^{n} \times T_g + C_{t-1}^{n-1} \times n \times s \ldots \quad (1)$$

Where n is the total number of computer nodes within an MPC system, t is the minimum number of computer nodes required to perform the computation process, s is the network latency between two nodes, and Tg is the time to generate an encryption key. Equation (2) represents the time required to generate and distribute the keys under the centralized approach:

$$\text{Time} = C_{t-1}^{n-1} \times T_g + C_{t-1}^{n-2} \times (n-1) \times s \ldots \quad (2)$$

Where n is the total number of computer nodes within an MPC system, t is the minimum number of computer nodes required to perform the computation process, s is the network latency between two nodes, and Tg is the time to generate an encryption key.

Specifically, FIG. 4 illustrates a graph 400 that compares the key distribution performance between the centralized approach and the decentralized approach by varying the total number of computer nodes (n) within an MPC system having a fixed minimum number of required nodes (t). The graph 400 has a horizontal axis 402 representing the total number of computer nodes (n) within an MPC system, and a vertical axis 404 representing times required for generating and distributing the necessary keys to the computer nodes. In this illustration, the minimum number of computer nodes (t) required to perform the computation is fixed at two. By keeping the number of required nodes constant and allow the total number of nodes to grow, one can increase the reliability level of the overall MPC system. The line 412 represents the times required to generate and distribute the keys using the centralized approach while the line 414 represents the times required to generate and distribute the keys using the decentralized approach. As shown, the times required to generate and distribute the keys proportionately increase as the number of total computer nodes (n) increases under both approaches, when the minimum number of computer nodes (t) required to perform the computation process is fixed (and small).

FIG. 5 illustrates a graph 500 that compares the key distribution performance between the centralized approach and the decentralized approach by varying the total number of computer nodes (n) and the minimum number of required nodes (t) within an MPC system. The graph 500 has a horizontal axis 502 representing the total number of computer nodes (n) within an MPC system, and a vertical axis 504 representing times required for generating and distributing the necessary keys to the computer nodes. In this illustration, the minimum number of computer nodes (t) required to perform the computation is maintained at one less than the total number of computer nodes (n) (e.g., t=n−1). By requiring such minimal difference between the number of required nodes and the total number of nodes, one can increase the security level of the overall MPC system. The line 512 represents the times required to generate and distribute the keys using the centralized approach while the line 514 represents the times required to generate and distribute the keys using the decentralized approach. As shown, the times required to generate and distribute the keys under the centralized approach increases drastically as the total number of computer nodes (n) and the minimum number of computer nodes (t) increase, while the times required to generate and distribute the keys under the decentralized approach remains substantially constant even as the total number of computer nodes (n) and the minimum number of computer nodes (t) increase.

FIG. 6 illustrates a graph 600 that compares the key distribution performance between the centralized approach and the decentralized approach by varying the total number of computer nodes (n) and the minimum number of required nodes (1) within an MPC system. However, the ratio between the minimum number of required nodes (1) and the total number of computer nodes (n) is fixed (e.g., 2:3 ratio, etc.). Furthermore, to simulate a real-world scenario where the computer nodes are located in different regions (e.g., different geographical regions, different computer networks, etc.), a substantially large network latency (e.g., between 12 ms and 300 ms) is added to the times. The graph 600 has a horizontal axis 602 representing the total number of computer nodes (n) within an MPC system, and a vertical axis 604 representing times required for generating and distributing the necessary keys to the computer nodes. In this illustration, the minimum number of computer nodes (1) required to perform the computation is maintained at a fixed ratio with the total number of computer nodes (n) (e.g., 2:3). The line 612 represents the times required to generate and distribute the keys using the centralized approach while the line 614 represents the times required to generate and distribute the keys using the decentralized approach. As shown, the times required to generate and distribute the keys under the centralized approach increases drastically as the total number of computer nodes (n) and the minimum number of computer nodes (t) increase, while the times required to generate and distribute the keys under the decentralized approach remains relatively constant even as the total number of computer nodes (n) and the minimum number of computer nodes (t) increase.

As such, the key distribution module 208 may adopt the centralized key distribution approach when the minimum number of computer nodes (1) required to perform the computation process is below a threshold number (e.g., 3, 5, 10, etc.) (which translates to a small number of keys assigned to each of the computer nodes). However, when the minimum number of computer nodes (1) required to perform the computation process is above the threshold (which translates to a large number of keys assigned to each of the computer nodes), the MPC configuration system may adopt the decentralized key distribution approach as it provides a much quicker processing time for generating and distributing the keys to the group of computer nodes.

Once the keys $K_1$ to $K_{10}$ are generated and distributed among the group of computer nodes $U_1$ to $U_5$ associated with the MPC system, the MPC system is ready to perform the computation process based on a collaboration among at least a portion of the group of computer nodes $U_1$ to $U_5$. In some embodiments, the MPC module 132 may discard any keys associated with the MPC system in its possession (e.g., if the MPC module 132 generates the keys using the centralized approach). In some embodiments, the MPC manager 202 may also store information associated with the MPC system in the data storage 260. The information may include identifiers of the computer nodes (e.g., the user device 110, the devices 140, 150, 180, and 190) that are part of the MPC system, the key distribution scheme 300, device and network attributes associated with the group of computer nodes obtained by the MPC module 132, and other information related to the MPC system. The MPC manager 202 may store information associated with each MPC system configured and deployed by the MPC module 132 in a separate record. For example, the MPC manager 202 may store a MPC record 222 associated with the MPC system generated for the user account of the user 118. When the MPC module 132 configures and deploys another MPC system (e.g., for another user account), the MPC manager may store information associated with the other MPC system in another record 224 within the data storage 260.

Subsequent to configuring and deploying one or more MPC systems, the MPC module 132 may receive computation requests for performing computation processes using the different MPC systems. For example, the MPC module 132 may receive a computation request for performing the computation process for the user account associated with the user 118. The user 118 may initiate a transaction request (e.g., a data encryption transaction, a cryptocurrency transaction, etc.) with the service provider server 130. In order to process the transaction request, the computation process is required to be performed. Thus, the user device 110 or the service application 138 may transmit a computation request to the MPC module 132. The MPC module 132 may identify the MPC record 222 associated with the user account of the user 118, and access the information associated with the MPC system. The computation module 210 may then cause the MPC system to perform the computation process.

Similar to the distribution of keys, there are also two different approaches in performing the computation process among the computer nodes. The first approach is using a cascade method to perform the computation process. Using the cascade method, a succession of sub-routines (e.g., encryption routines) is performed sequentially in a specific order. For example, when the computation process includes a process to encrypt plaintext data, the plaintext data must first be encrypted using a first key (e.g., $K_1$) in the set of keys to generate a first output. The first output is then encrypted using a second key (e.g., $K_2$) in the set of keys to generate a second output. Thus, each output from a previous routine using a previous key undergoes a current routine using a current key, until the output is processed using the last key in the set of keys. In the example illustrated here, using the cascade approach, the computation module 210 may first instruct, via the app interface 204, a computer node having the key $K_1$ (e.g., $U_3$, $U_4$, or $U_5$) to perform a first sub-routine. Since there are multiple computer nodes that satisfy the requirement, the computation module 210 may select one of the three computer nodes for performing the first sub-routine. In some embodiments, if the selected node is determined to be unavailable (e.g., no response from the computer node, etc.), the computation module 210 may select another computer node that satisfies the requirement (e.g., having the key $K_1$). The computation module 210 may continue to select a different node that satisfies the requirement until a node is available. If no node that satisfies the requirement is available, the computation module 210 may determine that the computation process has failed, and may transmit a signal indicating the failure to a device that made the request (e.g., the user device 110, the service application 138, etc.)

The first sub-routine may include encrypting plaintext data using the key $K_1$ to generate first encrypted data. After the computer node performs the first sub-routine, the computation module 210 may instruct, via the app interface 204, the MPC application of a computer node having the key $K_2$ (which may be the same or different from the computer node that performed the first sub-routine) to perform the second sub-routine. The computer node that performs the second sub-routine may be the same or different from the computer node that performs the first sub-routine. For example, if the computer node $U_3$ was chosen to perform the first sub-routine, the computation module 210 may select a different computer node (e.g., $U_2$, $U_4$, or $U_5$) to perform the second sub-routine, since the computer node $U_3$ does not have the key $K_2$. The computation module 210 may also instruct the MPC application of the computer node $U_3$ to transmit the first encrypted data to the computer node selected to perform the second sub-routine.

However, if the computer node $U_4$ or $U_5$ was chosen to perform the first sub-routine, the computation module 210 may use the same computer node to perform the second sub-routine, as either the computer node $U_4$ or $U_5$ has the key $K_2$ for performing the second sub-routine. The second sub-routine may include encrypting the first encryption data using the second key $K_2$ to generate second encryption data. The computation module 210 may continue to instruct the computer nodes to perform the sub-routines using the keys until all of the sub-routines are completed (e.g., data has been encrypted using all of the keys $K_1$ to $K_{10}$ in a sequential order).

The second approach of performing the computation process is using an XOR method to perform the computation process. In order to use the XOR method to perform the computation process, the computation module 210 may first generate a nonce for the computation request. In some embodiments, a different and unique nonce is generated every time the MPC system is requested to perform the computation process using the XOR method. For example, the nonce may be generated using a random number generator, or generated based on a time/date when the computation request is received. Each participating computer node within the MPC system may encrypt the nonce using the key(s) in its possession. For example, if the computer node $U_1$ is participating in the computation process, the computation module 210 may transmit the nonce to the computer node $U_1$, and may instruct the MPC application of the computer node $U_1$ to encrypt the nonce using each of the keys in its possession to generate one or more encrypted nonces. The computation module 210 may also transmit the nonce to at least two other computer nodes and instruct the MPC applications of the two other computer nodes to encrypt the nonce using each of the keys in their possessions to generate encrypted nonces. The computation module 210 may instruct the MPC application of each participating computer node to XOR the plaintext data with the encrypted nonces, and transmit the XORed data to the MPC module 132. Since there are ten total keys issued for the MPC system, the MPC module 132 should receive ten different XORed data. The computation module 132 may then XOR all of the ten XORed data to generate a final output.

As such, the speed of performing the computation process under the cascade approach is highly dependent on the network conditions of the computer nodes and the minimum number of required computer nodes (1), while the speed of performing the computation process under the XOR method only depends on the number of keys distributed among the group of computer nodes. In some embodiments, to optimize the performance of the MPC system, the computation module 210 may configure the MPC system to perform the computation process using the cascade method when the networking conditions associated with the group of computer nodes are good (e.g., latency and failure rate below a threshold, etc.) and that the minimum number of required computer nodes (1) is low (e.g., below a threshold value such as 3, 5, 10, etc.). Conversely, the computation module 210 may configure the MPC system to perform the computation process using the XOR method when the networking conditions associated with the group of computer nodes are not ideal (e.g., latency and failure rate above the threshold, etc.) or the minimum number of required computer nodes (1) is high (e.g., above a threshold value such as 3, 5, 10, etc.).

In some embodiments, the MPC module 132 may obtain device attributes and network attributes from each of the computer nodes $U_1$ to $U_5$ within the MPC system when the MPC module 132 is configuring and deploying the MPC system. The device attributes and network attributes may be stored in the record 222 within the data storage 260. Based on the device attributes and the network attributes, the computation module 210 may determine whether the MPC system should use the cascade approach or the XOR approach in performing the computation process.

In some embodiments, since the network conditions associated with the computer nodes may change (e.g., based on a location of the computer node, a network traffic condition, etc.), the computation module 210 may perform a network test for the group of computer nodes after receiving the computation request, and may dynamically determine (or modify) an approach (e.g., the cascade approach or the XOR approach) for performing the computation process for the computation request based on the network conditions determined for the group of computer nodes in real-time. For example, the MPC system may initially be configured to perform the computation process using the cascade approach. After receiving the computation request (e.g., from the user device 110, the service application 138, etc.), the computation module 210 may obtain network attributes of the group of computer nodes, for example, by preforming network tests on the group of computer nodes. When it is determined that the network conditions of the group of computer nodes has deteriorated (e.g., latency being above a threshold, etc.), the configuration module 206 may modify the configuration of the MPC system in real time by changing the approach to perform the computation process from the cascade approach to the XOR approach. The computation module 210 may cause the group of computer nodes to perform the computation process using the XOR method according to the modified configuration.

In some embodiments, when the condition of one or more of the group of computer nodes has deteriorated further (e.g., failure rate above a threshold, becomes unavailable, etc.), the configuration module 206 may dynamically reduce the minimum number of required computer nodes for performing the computation process. For example, the configuration module 206 may determine which computer nodes have become unavailable and remove a requirement of using one or more keys, possessed by those computer nodes, in performing the computation process.

In some embodiments, when a cascade approach is adopted in performing the computation process, the computation module 210 may also determine an order in which the participating computer nodes perform the sub-routines. Since the computer nodes may have overlapping keys in their possessions, a particular sub-routine may be performed by one or multiple different computer nodes. As discussed above, any one of the computer nodes $U_3$, $U_4$, and $U_5$ may be selected to perform the first sub-routine as each of the computer nodes computer nodes $U_3$, $U_4$, and $U_5$ has the first key $K_1$. While any one of the computer nodes $U_3$, $U_4$, and $U_5$ may be capable of performing the first sub-routine, only the computer nodes $U_4$, and $U_5$ can perform the second sub-routine, as each of the computer nodes $U_4$, and $U_5$ has the second key $K_1$ but not the computer node $U_3$. Having the same computer node performing consecutive sub-routines dramatically reduces the time required to perform the computation process as it reduces the time spent on transmitting data (e.g., the first encrypted data) to another computer node over a network to perform the next sub-routine.

Thus, in some embodiments, the computation module 210 may select, among computer nodes that are capable for performing a particular sub-routine, a computer node that is capable of performing the longest consecutive sequence of sub-routines based on the particular sub-routine. In this example, the computation module 210 may select the computer node $U_5$ for performing the first sub-routine as the computer node $U_5$ is capable of performing the first, second, and third sub-routines and the remaining computer nodes $U_3$ and $U_4$ can only perform one sub-routine or two consecutive sub-routines based on the first sub-routine. If the computer node $U_5$ is unavailable, the computation module 210 may select the next best computer node $U_4$ for performing the first sub-routine. After the computer node $U_5$ finishes the performance of the third sub-routine using the key $K_3$, the computation module 210 may determine that any one of the computer nodes $U_2$, $U_3$, or $U_4$ is capable of performing the fourth sub-routine as each of these computer nodes has the key $K_4$. Among the computer nodes $U_2$, $U_3$, and $U_4$, the computation module 210 may select the computer node $U_4$ for performing the fourth sub-routine as the computer node $U_4$ can also perform the fifth sub-routine, but not the other two computer nodes. The computation module 210 may continue to select computer nodes for performing different sub-routines using this methodology until all of the sub-routines are completed.

The output from the MPC system based on performing the computation process may be transmitted to the service application 138. The service application 138 may use the output in the processing of a transaction, such as a data encryption transaction, a data access transaction, a payment transaction, a cryptocurrency transaction, etc. Using the techniques described herein, MPC systems may be configured and deployed for different users (or user accounts) based on the attributes associated with devices used by the user (or user account) for the corresponding MPC system. Different MPC systems may be configured differently to optimize the performance of generation and distribution of keys and the computation process. Furthermore, each MPC system may also be dynamically configured to adapt a processing approach in performing the computation process in real-time based on the network condition associated with the computer nodes of the MPC system at the time the computation request is made. The dynamic approach to MPC systems as described herein enhance the case and performance of setting up and utilizing the MPC systems.

Figure 7:
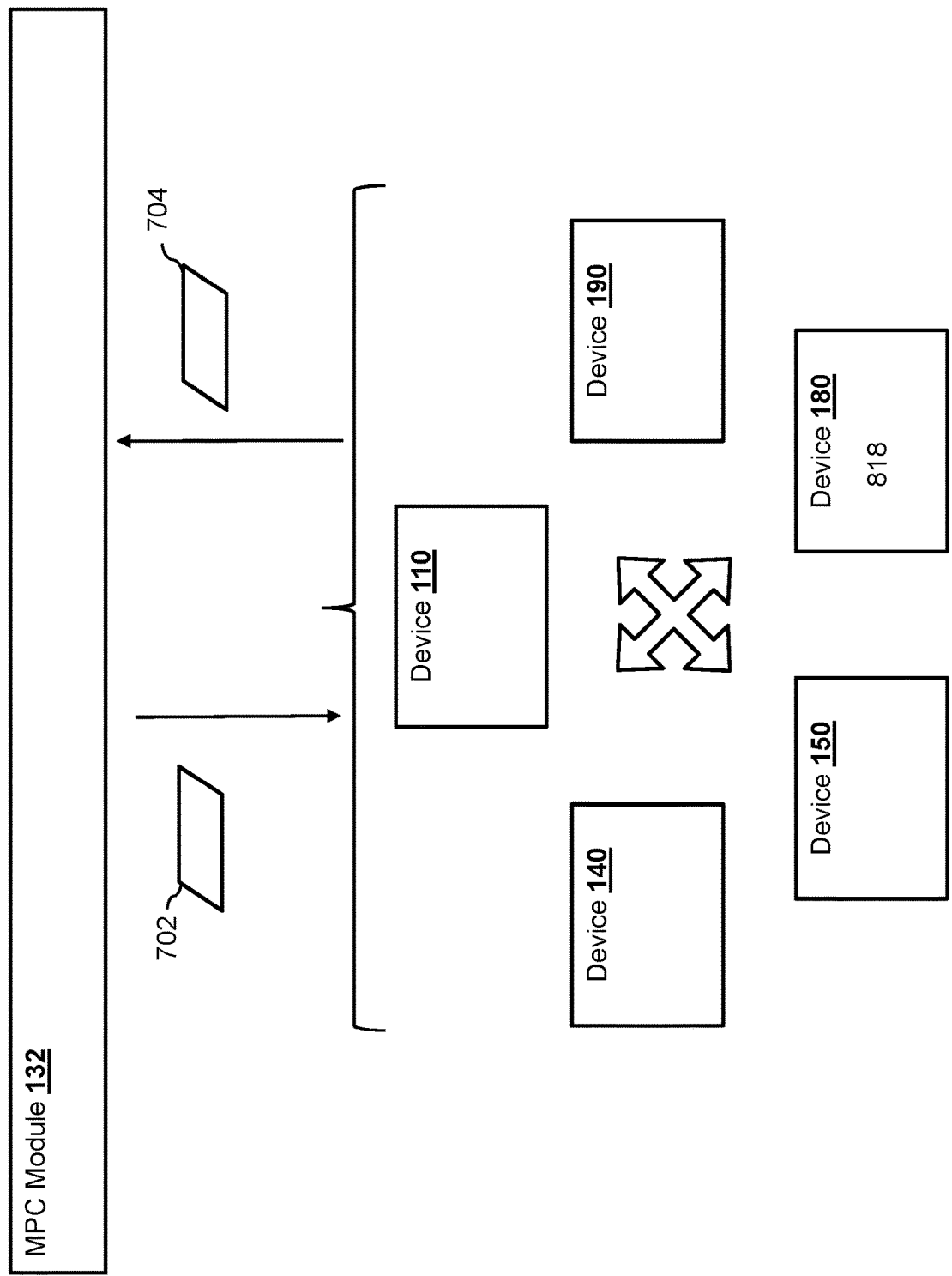
FIG. 7 illustrates exemplary interactions between the MPC module and the group of computer nodes when performing the computation process according to an embodiment of the present disclosure.

FIG. 7 illustrates the interactions between the MPC module and the group of computer nodes when performing the computation process. Based on a computation request, the MPC module 132 may generate (or otherwise obtain) data 702 that is transmitted to the group of computer nodes (or a first selected computer node for performing the first sub-routine). The data 702 may include plaintext data to be encrypted based on the computation process. If the XOR approach is used, the data 702 may also include a nonce generated for the computation request. The computer nodes (e.g., the user device 110, the device 140, 150, 180, and 190) may perform the corresponding sub-routines and transmit intermediate output data to each other in order to perform the computation process. When all of the sub-routines associated with the computation process is completed, the group of computer nodes may transmit the output 704 back to the MPC module 132.

Figure 8:
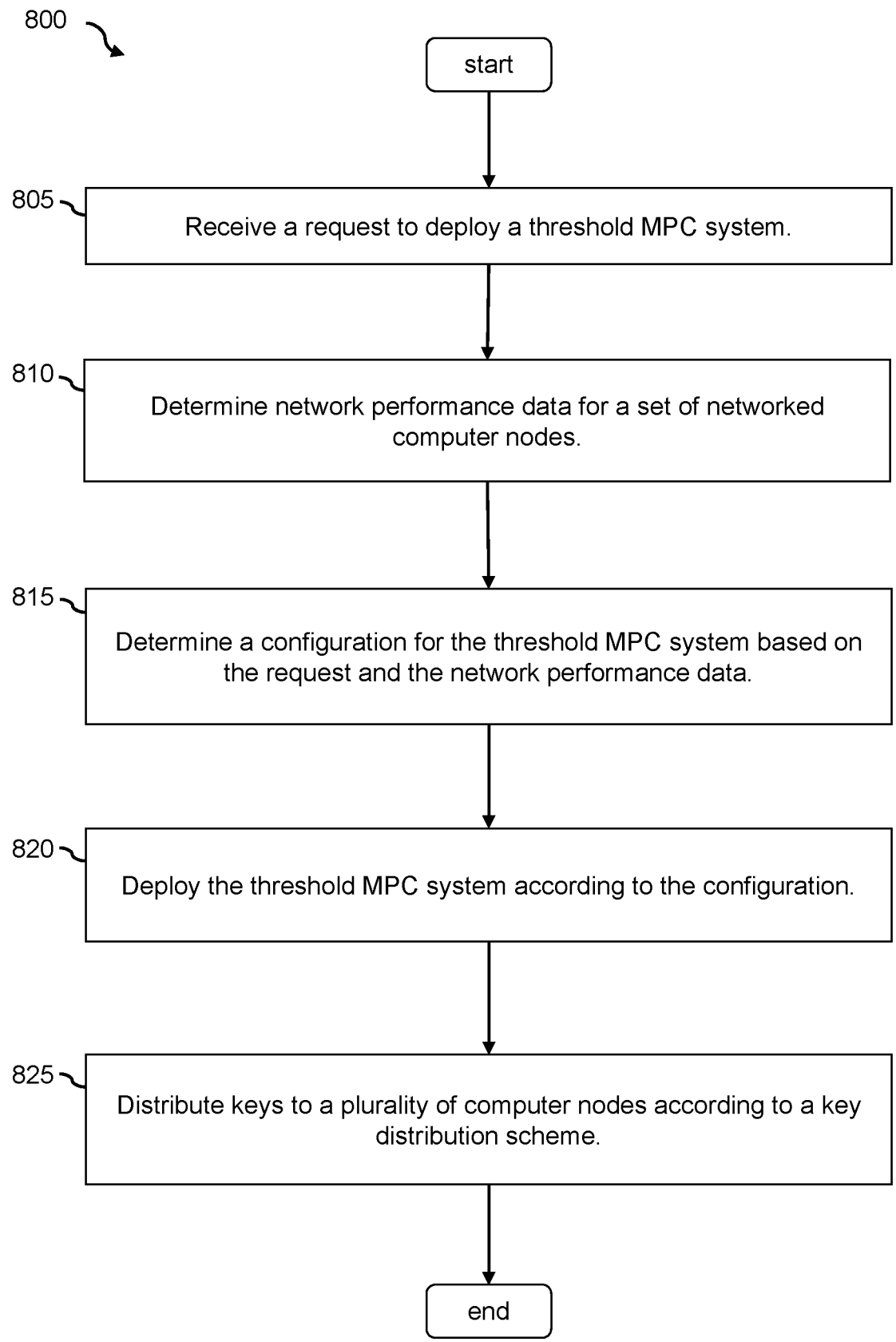
FIG. 8 is a flowchart showing a process of configuring and deploying an MPC system according to an embodiment of the present disclosure.

FIG. 8 illustrates a process 800 for configuring and deploying an MPC system according to various embodiments of the disclosure. In some embodiments, at least a portion of the process 800 may be performed by the MPC module 132 and the MPC applications. The process 800 may begin by receiving (at step 805) a request to deploy a threshold MPC system. For example, the MPC module 132 may receive a request to configure and deploy an MPC system for the user account of the user 118, when the user 118 registers a new user account with the service provider server.

The process 800 then determines (at step 810) network performance data for a set of networked computer nodes and determines (at step 815) a configuration for the threshold MPC system based on the request and the network performance data. For example, the MPC module 132 may access the computer nodes available to be used in the MPC system, such as the user device 110, the devices 140, 150, 180, and 190. The MPC module 132 may determine device attributes (e.g., security features, etc.) and network attributes (e.g., latency, failure rates, etc.) of the computer nodes. The MPC module 132 may also determine a security requirement and a resiliency requirement for the MPC system, based at least in part on the request. For example, the MPC module 132 may analyze the type of transactions that would be conducted using the outcome of the computation process to determine the security requirement of the MPC system. The MPC module 132 may also analyze the attributes of the various devices of the user 118 to determine a resiliency requirement (e.g., how often are the devices unavailable) for the MPC system.

The process deploys (at step 820) the threshold MPC system according to the configuration and distributes (at step 825) keys to a plurality of computer nodes according to a key distribution scheme. For example, the MPC module 132 may determine a total number of computer nodes for the MPC system, and may cause each of the computer nodes selected as part of the MPC system to install an MPC application for performing functionalities associated with the MPC system. The MPC module 132 may also determine the minimum number of computer nodes for performing the computation process. Based on the total number of computer nodes and the minimum number of computer nodes, the MPC module 132 may generate a number of keys for the MPC system. The MPC module 132 may also determine a key distribution scheme for distributing keys among the computer nodes associated with the MPC system such that any combination of computer nodes more than the minimum number of computer nodes would have the entire set of keys generated for the MPC system. The MPC module 132 may distribute the keys among the computer nodes according to the key distribution scheme. After generating and distributing the keys, the MPC system is ready to perform the computation process for the user account.

Figure 9:
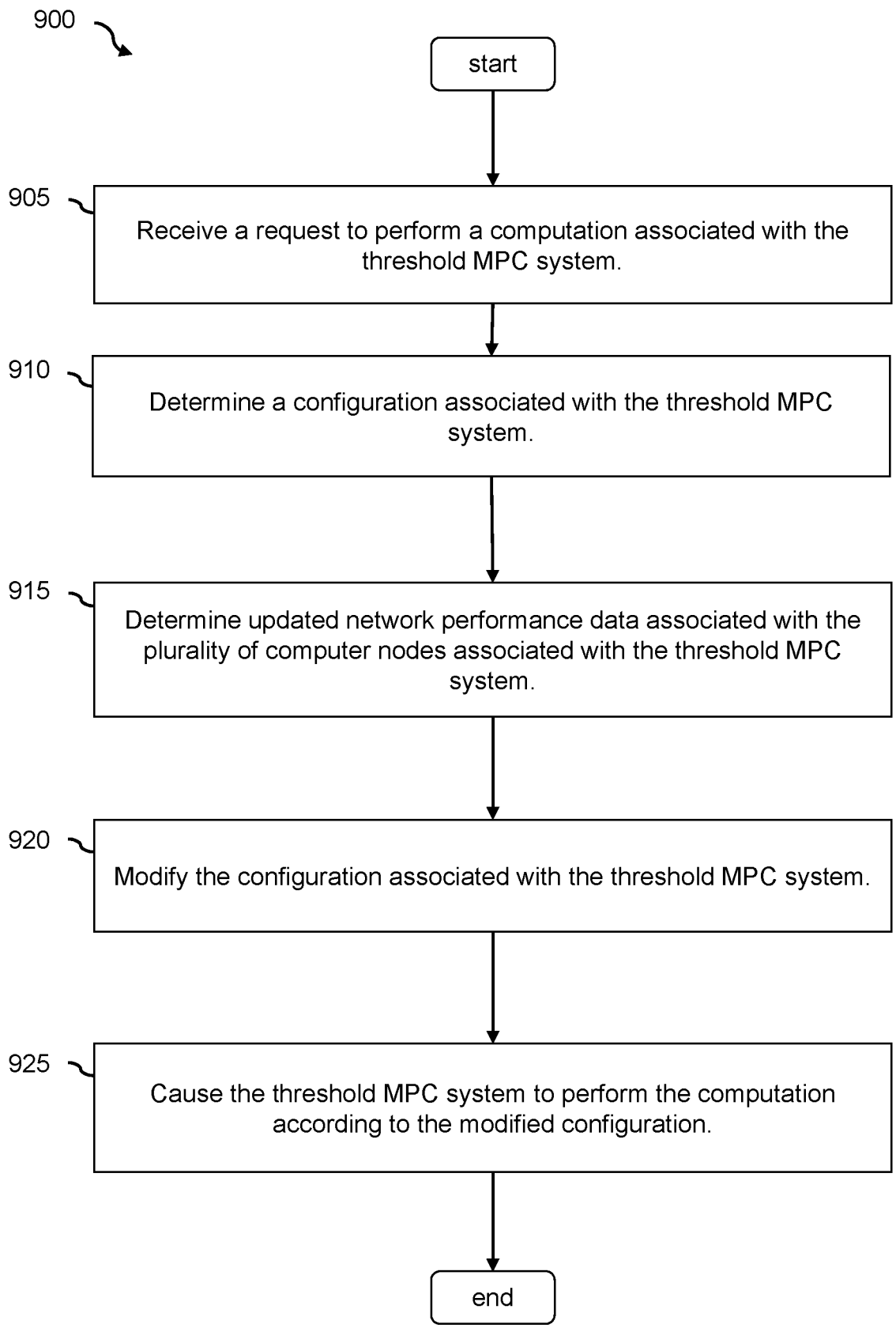
FIG. 9 is a flowchart showing a process of utilizing an MPC system to perform a computation process according to an embodiment of the present disclosure.

FIG. 9 illustrates a process 900 for utilizing an MPC system for performing a computation process according to various embodiments of the disclosure. In some embodiments, at least a portion of the process 900 may be performed by the MPC module 132 and the MPC applications. The process 900 may begin by receiving (at step 905) a request to perform a computation associated with the threshold MPC system. For example, the MPC module 132 may receive a computation request, for example from the user device 110 or the service application 138. The computation request may be associated with a transaction, for which an outcome from the computation process will be used.

The process 900 determines (at step 910) a configuration associated with the threshold MPC system. For example, the MPC module 132 may retrieve the record 222 from the data storage 260. The MPC module 132 may determine, from the record 222, the computer nodes that are associated with the MPC system (e.g., the user device 110, the devices 140, 150, 180, and 190). The MPC module 132 may also determine the minimum number of computer nodes required to perform the computation process.

The process 900 then determines (at step 915) updated network performance data associated with the plurality of computer nodes associated with the threshold MPC system and modifies (at step 920) the configuration associated with the threshold MPC system. For example, the MPC module 132 may determine the network conditions (e.g., latency, failure, etc.) associated with the group of computer nodes, and may determine to use a cascade method or an XOR method for performing the computation process for the computation request. Furthermore, if the network conditions associated with multiple computer nodes are poor (e.g., above a threshold latency rate and/or a threshold failure rate), the MPC module 132 may reduce the minimum number of required computer node for processing the computation process. For example, instead of requiring the entire set of encryption keys, only a portion of the keys are required for the computation process for this computation request.

The process 900 causes (at step 925) the threshold MPC system to perform the computation according to the modified configuration. For example, the MPC module 132 may instruct the MPC applications of each of the computer nodes to perform the corresponding sub-routines using the keys stored on the corresponding computer nodes. After completing all of the sub-routines, the computer nodes may transmit the output to the MPC module 132, which may then be used by the service application 138 to perform the transaction through the user account.

Figure 10:
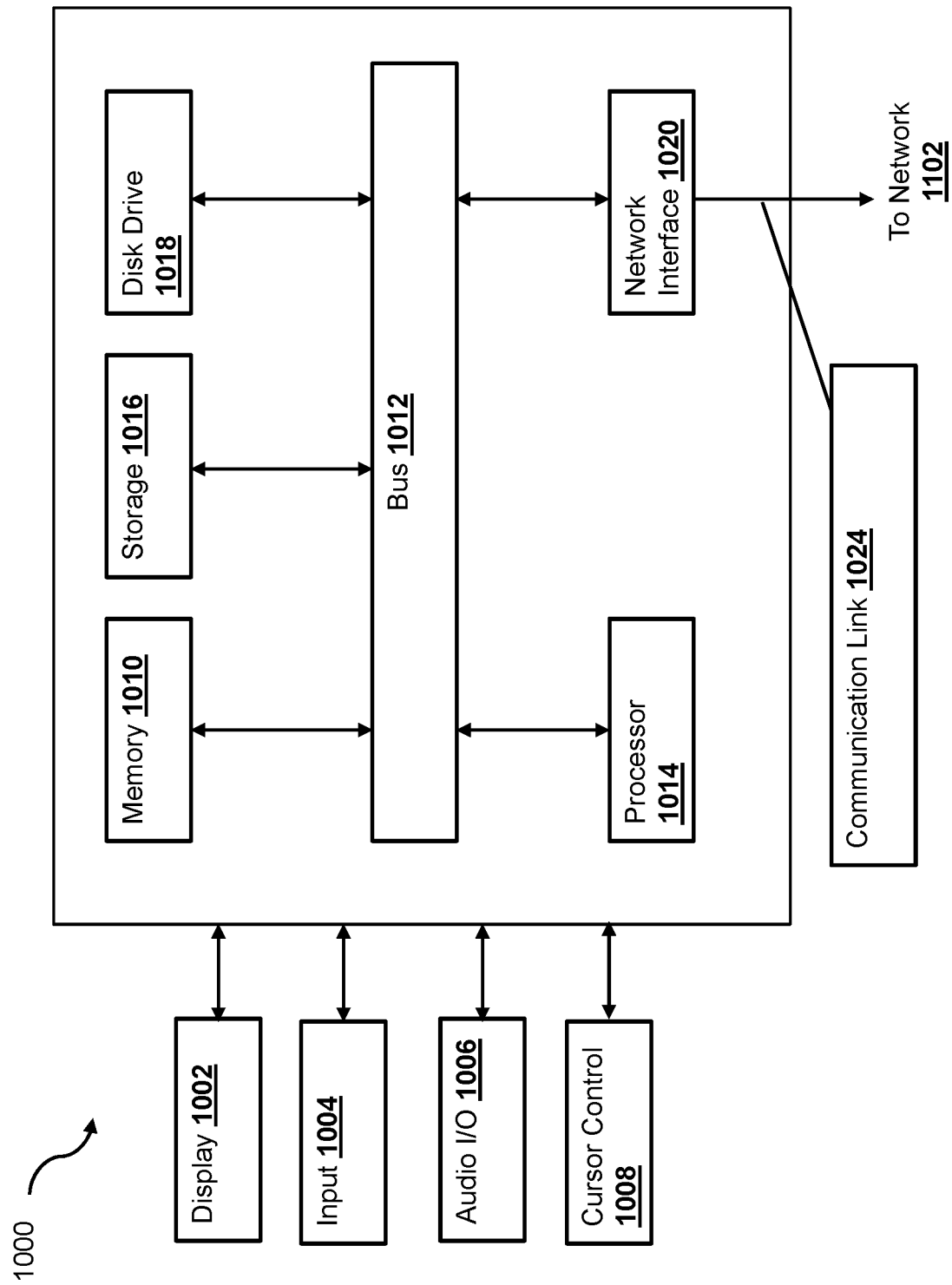
FIG. 10 is a block diagram of a system for implementing a device according to an embodiment of the present disclosure.

FIG. 10 is a block diagram of a computer system 1000 suitable for implementing one or more embodiments of the present disclosure, including the service provider server 130, the user device 110, and devices 140, 150, 180, and 190 (computer nodes $U_1$ to $U_5$). In various implementations, the user device 110, and other user devices may include a mobile cellular phone, personal computer (PC), laptop, wearable computing device, etc. adapted for wireless communication, and each of the service provider server 130 (and other servers such as third-party servers) may include a network computing device, such as a server. Thus, it should be appreciated that the devices/servers 110, 130, 140, 150, 180, and 190, may be implemented as the computer system 1000 in a manner as follows.

The computer system 1000 includes a bus 1012 or other communication mechanism for communicating information data, signals, and information between various components of the computer system 1000. The components include an input/output (I/O) component 1004 that processes a user (i.e., sender, recipient, service provider) action, such as selecting keys from a keypad/keyboard, selecting one or more buttons or links, etc., and sends a corresponding signal to the bus 1012. The I/O component 1004 may also include an output component, such as a display 1002 and a cursor control 1008 (such as a keyboard, keypad, mouse, etc.). The display 1002 may be configured to present a login page for logging into a user account or a checkout page for purchasing an item from a merchant. An optional audio input/output component 1006 may also be included to allow a user to use voice for inputting information by converting audio signals. The audio I/O component 1006 may allow the user to hear audio. A transceiver or network interface 1020 transmits and receives signals between the computer system 1000 and other devices, such as another user device, a merchant server, or a service provider server via a network 1022, such as network 160 of FIG. 1. In one embodiment, the transmission is wireless, although other transmission mediums and methods may also be suitable. A processor 1014, which can be a micro-controller, digital signal processor (DSP), or other processing component, processes these various signals, such as for display on the computer system 1000 or transmission to other devices via a communication link 1024. The processor 1014 may also control transmission of information, such as cookies or IP addresses, to other devices.

The components of the computer system 1000 also include a system memory component 1010 (e.g., RAM), a static storage component 1016 (e.g., ROM), and/or a disk drive 1018 (e.g., a solid-state drive, a hard drive). The computer system 1000 performs specific operations by the processor 1014 and other components by executing one or more sequences of instructions contained in the system memory component 1010. For example, the processor 1014 can perform the multi-party computation functionalities described herein according to the processes 800 and 900.

Logic may be encoded in a computer readable medium, which may refer to any medium that participates in providing instructions to the processor 1014 for execution. Such a medium may take many forms, including but not limited to, non-volatile media, volatile media, and transmission media. In various implementations, non-volatile media includes optical or magnetic disks, volatile media includes dynamic memory, such as the system memory component 1010, and transmission media includes coaxial cables, copper wire, and fiber optics, including wires that comprise the bus 1012. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 1000. In various other embodiments of the present disclosure, a plurality of computer systems 1000 coupled by the communication link 1024 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
    a non-transitory memory; and
    one or more hardware processors coupled with the non-transitory memory and configured to read instructions from the non-transitory memory to cause the system to perform operations comprising:
        receiving a request to deploy a networked system for performing a computation, wherein the request specifies a plurality of computing devices associated with the networked system;
        determining computation characteristics associated with the computation and device characteristics associated with the plurality of computing devices;
        determining a configuration for the networked system based on the computation characteristics and the device characteristics, wherein the configuration specifies a minimum number of computing devices, among the plurality of computing devices, required to perform the computation; and
        deploying the networked system based on the configuration, wherein the deploying comprises (i) determining a plurality of keys required to perform the computation based on the configuration and (ii) distributing different subsets of the plurality of keys to different computing devices in the plurality of computing devices.

2. The system of claim 1, wherein the computation characteristics represent at least one of a security requirement or a resiliency requirement for performing the computation.

3. The system of claim 1, wherein the device characteristics represent at least one of a hardware configuration, a software configuration, a presence of a security component, or a network condition.

4. The system of claim 1, wherein the configuration further specifies a number of keys required to perform the computation, and wherein the operations further comprise:
    generating the plurality of keys according to the number of keys required to perform the computation.

5. The system of claim 1, wherein the operations further comprise:
    determining that a first computing device in the plurality of computing devices fails to satisfy a security requirement; and
    removing the first computing device from the plurality of computing devices associated with the networked system.

6. The system of claim 1, wherein the operations further comprise:
    performing a network test on one or more networks that connect the plurality of computing devices, wherein the device characteristics are determined based on a result of the network test.

7. The system of claim 1, wherein the computation is part of a process for performing electronic payment transactions for an account with a service provider, and wherein the computation characteristics are determined based on at least one of amounts associated with the electronic payment transactions, a frequency of transactions conducted through the account, or a type of the transactions conducted through the account.

8. A non-transitory machine-readable medium having stored thereon machine-readable instructions executable to cause a machine to perform operations comprising:
    receiving a request to configure a networked system for performing a computation;
    determining a plurality of computing devices associated with the networked system based on the request;
    determining computation characteristics associated with the computation and device characteristics associated with the plurality of computing devices;
    determining a configuration for the networked system based on the computation characteristics and the device characteristics, wherein the configuration specifies a minimum number of computing devices, among the plurality of computing devices, required to perform the computation; and
    deploying the networked system based on the configuration, wherein the deploying comprises distributing different subsets of a plurality of keys to different computing devices in the plurality of computing devices.

9. The non-transitory machine-readable medium of claim 8, wherein the operations further comprise:
    determining that the plurality of computing devices comprises a first number of computing devices; and
    determining the minimum number of computing devices based on the first number of computing devices, wherein the minimum number of computing devices is less than the first number of computing devices.

10. The non-transitory machine-readable medium of claim 8, wherein the configuration further specifies a number of keys required to perform the computation, and wherein the operations further comprise:
    generating the plurality of keys according to the number of keys required to perform the computation.

11. The non-transitory machine-readable medium of claim 8, wherein the operations further comprise:
    determining that a first computing device in the plurality of computing devices fails to satisfy a security requirement; and
    removing the first computing device from the plurality of computing devices associated with the networked system.

12. The non-transitory machine-readable medium of claim 8, wherein the operations further comprise:
  performing a network test on one or more networks that connect the plurality of computing devices, wherein the device characteristics are determined based on a result of the network test.

13. The non-transitory machine-readable medium of claim 8, wherein the computation is part of a process for performing data access transactions for an account with a service provider, and wherein the computation characteristics are determined based on at least one of a type of data being accessed, a frequency of transactions conducted through the account, or a volume of data being accessed via the transactions conducted through the account.

14. A method comprising:
  receiving a request to deploy a networked system for performing a computation, wherein the request specifies a plurality of computing devices associated with the networked system;
  determining, by a computer system, computation characteristics associated with the computation and device characteristics associated with the plurality of computing devices;
  determining, by the computer system, a configuration for the networked system based on the computation characteristics and the device characteristics, wherein the configuration specifies a minimum number of computing devices, among the plurality of computing devices, required to perform the computation; and
  deploying, by the computer system, the networked system based on the configuration, wherein the deploying comprises (i) determining a plurality of keys required to perform the computation based on the configuration and (ii) distributing different subsets of the plurality of keys to different computing devices in the plurality of computing devices.

15. The method of claim 14, wherein the computation characteristics represent at least one of a security requirement or a resiliency requirement for performing the computation.

16. The method of claim 14, wherein the device characteristics represent at least one of a hardware configuration, a software configuration, a presence of a security component, or a network condition.

17. The method of claim 14, wherein the configuration further specifies a number of keys required to perform the computation, and wherein the operations further comprise:
  generating the plurality of keys according to the number of keys required to perform the computation.

18. The method of claim 14, further comprising:
  determining that a first computing device in the plurality of computing devices fails to satisfy a security requirement; and
  removing the first computing device from the plurality of computing devices associated with the networked system.

19. The method of claim 14, further comprising:
  performing a network test on one or more networks that connect the plurality of computing devices, wherein the device characteristics are determined based on a result of the network test.

20. The method of claim 14, wherein the computation is part of a process for performing electronic payment transactions for an account with a service provider, and wherein the computation characteristics are determined based on at least one of amounts associated with the electronic payment transactions, a frequency of transactions conducted through the account, or a type of the transactions conducted through the account.

* * * * *

UNITED STATES PATENT AND TRADEMARK OFFICE
CERTIFICATE OF CORRECTION

Page 1 of 2

PATENT NO. : 12,231,543 B2
APPLICATION NO. : 18/414872
DATED : February 18, 2025
INVENTOR(S) : Hubert Andre Le Van Gong, Khai Hanh Tang and Shanshan Hua It is certified that error appears in the above-identified patent and that said Letters Patent is hereby corrected as shown below:

In the Specification

In the DETAILED DESCRIPTION:

Column 4, Line 55, change "minimum number (1) of required" to --minimum number (t) of required--.

Column 4, Line 66, change "nodes (1) when the resiliency" to --nodes (t) when the resiliency--.

Column 5, Line 1, change "required computer nodes (1)" to --required computer nodes (t)--.

Column 5, Line 15, change "computer nodes (1) determined" to --computer nodes (t) determined--.

Column 6, Line 31, change "nodes (1) required to perform" to --nodes (t) required to perform--.

Column 6, Line 35, change "computer nodes (1) required" to --computer nodes (t) required--.

Column 7, Line 18, change "computer nodes (1), while the" to --computer nodes (t), while the--.

Column 7, Line 28, change "computer nodes (1) is low" to --computer nodes (t) is low--.

Column 7, Line 35, change "computer nodes (1) is high" to --computer nodes (t) is high--.

Column 11, Line 21, change "(1) required to perform" to --(t) required to perform--.

Column 12, Line 59, change "computer nodes (1) required" to --computer nodes (t) required--.

Column 12, Line 63, change "computer nodes (1) required" to --computer nodes (t) required--.

Column 13, Line 1, change "computer nodes (1) required" to --computer nodes (t) required--.

Signed and Sealed this
Twenty-ninth Day of April, 2025

Coke Morgan Stewart
*Acting Director of the United States Patent and Trademark Office*

CERTIFICATE OF CORRECTION (continued)
U.S. Pat. No. 12,231,543 B2

Column 13, Line 8, change "computer nodes (1) required" to --computer nodes (t) required--.

Column 17, Line 1, change "nodes (1) within an MPC" to --nodes (t) within an MPC--.

Column 17, Line 2, change "required nodes (1) and the" to --required nodes (t) and the--.

Column 17, Lines 13-14, change "computer nodes (1) required" to --computer nodes (t) required--.

Column 17, Line 31, change "computer nodes (1) required" to --computer nodes (t) required--.

Column 17, Line 35, change "computer nodes (1) required" to --computer nodes (t) required--.

Column 19, Line 60, change "computer nodes (1) is low" to --computer nodes (t) is low--.

Column 19, Lines 66-67, change "computer nodes (1) is high" to --computer nodes (t) is high--.

Column 21, Lines 45-46, change "enhance the case and performance" to --enhance the ease and performance--.